US012650965B2

(12) United States Patent
Davis et al.

(10) Patent No.: US 12,650,965 B2
(45) Date of Patent: Jun. 9, 2026

(54) EXTERNALLY DISTRIBUTED BUCKETS FOR EXECUTION OF QUERIES

(71) Applicant: Cisco Technology, Inc., San Jose, CA (US)

(72) Inventors: Brent Davis, Fort Collins, CO (US); David Johns DeWitt, Newton, MA (US); Derek Feriancek, Deerwood, MN (US); Oleksandr Gyryk, Livermore, CA (US); Ankit Jain, San Francisco, CA (US); Balaji Rao, San Jose, CA (US); Douglas Rapp, Jamaica Plain, MA (US); Sai Krishna Sajja, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/414,157

(22) Filed: Jan. 16, 2024

(65) Prior Publication Data

US 2025/0028698 A1     Jan. 23, 2025

Related U.S. Application Data

(60) Provisional application No. 63/514,064, filed on Jul. 17, 2023.

(51) Int. Cl.
*G06F 16/22*      (2019.01)
*G06F 16/2455*      (2019.01)
*G06F 16/28*      (2019.01)
(52) U.S. Cl.
CPC .... *G06F 16/2228* (2019.01); *G06F 16/24561* (2019.01); *G06F 16/285* (2019.01)

(58) Field of Classification Search
CPC ........... G06F 16/2228; G06F 16/24561; G06F 16/285
(Continued)

(56) References Cited

U.S. PATENT DOCUMENTS 5,187,750 A    2/1993  Behera
5,590,321 A    12/1996  Lin et al.
(Continued)

FOREIGN PATENT DOCUMENTS

CN    103729447 A    4/2014
CN    105893205 A    8/2016
(Continued)

OTHER PUBLICATIONS

Bakliwal S., "A Comprehensive Guide to Apache Flink Ecosystem Components," published Feb. 17, 2017; 7 pages.
(Continued)

*Primary Examiner* — Cam Y T Truong
(74) *Attorney, Agent, or Firm* — Shook, Hardy & Bacon L.L.P.

(57)     ABSTRACT
A data intake and query system can manage the search of data stored at an external location relative to the data intake and query system using one or more indexers. The data intake and query system can receive data stored at the external location. The data intake and query system can process the data and generate an index using the one or more indexers. The data intake and query system can discard the data and store the index and a location identifier of the external location in one or more buckets. In response to a query, the data intake and query system can identify that at least a subset of the data is responsive to the query using the index and can obtain the at least subset of the data from the external location using the location identifier.

20 Claims, 8 Drawing Sheets

620

(58) Field of Classification Search
USPC ......................................................... 707/741
See application file for complete search history.

(56) References Cited

U.S. PATENT DOCUMENTS

| | | | |
|---|---|---|---|
| 5,623,652 A | 4/1997 | Vora et al. |
| 5,812,793 A | 9/1998 | Shakib et al. |
| 5,913,214 A | 6/1999 | Madnick et al. |
| 5,918,049 A | 6/1999 | Syväniemi |
| 5,941,969 A | 8/1999 | Ram et al. |
| 6,009,422 A | 12/1999 | Ciccarelli |
| 6,081,883 A | 6/2000 | Popelka et al. |
| 6,154,781 A | 11/2000 | Bolam et al. |
| 6,185,666 B1 | 2/2001 | Murray et al. |
| 6,205,441 B1 | 3/2001 | Al-Omari et al. |
| 6,282,537 B1 | 8/2001 | Madnick et al. |
| 6,408,294 B1 | 6/2002 | Getchius et al. |
| 6,430,553 B1 | 8/2002 | Ferret |
| 6,463,454 B1 | 10/2002 | Lumelsky et al. |
| 6,466,980 B1 | 10/2002 | Lumelsky et al. |
| 6,490,585 B1 | 12/2002 | Hanson et al. |
| 6,502,091 B1 | 12/2002 | Chundi et al. |
| 6,505,191 B1 | 1/2003 | Baclawski |
| 6,578,131 B1 | 6/2003 | Larson et al. |
| 6,741,982 B2 | 5/2004 | Soderstrom et al. |
| 6,786,418 B1 | 9/2004 | Francois |
| 6,920,396 B1 | 7/2005 | Wallace et al. |
| 7,007,275 B1 | 2/2006 | Hanson et al. |
| 7,039,764 B1 | 5/2006 | Shetty et al. |
| 7,233,939 B1 | 6/2007 | Ziauddin |
| 7,249,192 B1 | 7/2007 | Brewer et al. |
| 7,290,196 B1 | 10/2007 | Annayya et al. |
| 7,370,068 B1 | 5/2008 | Pham et al. |
| 7,505,985 B2 | 3/2009 | Kilroy |
| 7,536,686 B2 | 5/2009 | Tan et al. |
| 7,634,511 B1 | 12/2009 | Freiheit et al. |
| 7,685,109 B1 | 3/2010 | Ransil et al. |
| 7,685,281 B1 | 3/2010 | Saraiya et al. |
| 7,689,553 B2 | 3/2010 | Zuzarte |
| 7,689,633 B1 | 3/2010 | Li et al. |
| 7,698,267 B2 | 4/2010 | Papakonstantinou et al. |
| 7,702,610 B2 | 4/2010 | Zane et al. |
| 7,769,722 B1 | 8/2010 | Bergant et al. |
| 7,895,359 B2 | 2/2011 | Reed et al. |
| 7,937,344 B2 | 5/2011 | Baum et al. |
| 7,962,464 B1 | 6/2011 | Brette et al. |
| 8,019,725 B1 | 9/2011 | Mulligan et al. |
| 8,112,425 B2 | 2/2012 | Baum et al. |
| 8,190,593 B1 | 5/2012 | Dean |
| 8,195,922 B2 | 6/2012 | Chen et al. |
| 8,412,696 B2 | 4/2013 | Zhang et al. |
| 8,473,316 B1 | 6/2013 | Panzitta et al. |
| 8,504,620 B2 | 8/2013 | Chi et al. |
| 8,527,645 B1 | 9/2013 | Proffit et al. |
| 8,589,375 B2 | 11/2013 | Zhang et al. |
| 8,589,403 B2 | 11/2013 | Marquardt et al. |
| 8,589,432 B2 | 11/2013 | Zhang et al. |
| 8,601,112 B1 | 12/2013 | Nordstrom et al. |
| 8,682,925 B1 | 3/2014 | Marquardt et al. |
| 8,719,520 B1 | 5/2014 | Piszczek et al. |
| 8,738,587 B1 | 5/2014 | Bitincka et al. |
| 8,738,629 B1 | 5/2014 | Bitincka et al. |
| 8,751,529 B2 | 6/2014 | Zhang et al. |
| 8,761,077 B2 | 6/2014 | Kim et al. |
| 8,762,367 B2 | 6/2014 | Burger et al. |
| 8,769,493 B2 | 7/2014 | Arnold et al. |
| 8,788,525 B2 | 7/2014 | Neels et al. |
| 8,788,526 B2 | 7/2014 | Neels et al. |
| 8,793,225 B1 | 7/2014 | Bitincka et al. |
| 8,806,361 B1 | 8/2014 | Noel et al. |
| 8,812,490 B1 | 8/2014 | Cappiello et al. |
| 8,838,678 B1 | 9/2014 | Weiss |
| 8,849,891 B1 | 9/2014 | Suchter et al. |
| 8,874,755 B1 | 10/2014 | Deklich et al. |
| 8,874,961 B2 | 10/2014 | Pillai et al. |
| 8,924,476 B1 | 12/2014 | Granström et al. |
| 8,935,257 B1 | 1/2015 | Vermuri et al. |
| 8,935,302 B2 | 1/2015 | Flynn et al. |
| 8,943,569 B1 | 1/2015 | Luckett, Jr. et al. |
| 8,959,221 B2 | 2/2015 | Morgan |
| 8,983,912 B1 | 3/2015 | Beedgen et al. |
| 8,983,994 B2 | 3/2015 | Neels et al. |
| 8,990,148 B1 | 3/2015 | Ziegler et al. |
| 9,015,197 B2 | 4/2015 | Richards et al. |
| 9,087,030 B2 | 7/2015 | Basile |
| 9,087,090 B2 | 7/2015 | Cormier et al. |
| 9,124,612 B2 | 9/2015 | Vasan et al. |
| 9,128,636 B2 | 9/2015 | Arakawa |
| 9,128,980 B2 | 9/2015 | Neels et al. |
| 9,128,985 B2 | 9/2015 | Marquardt et al. |
| 9,130,971 B2 | 9/2015 | Vasan et al. |
| 9,135,560 B1 | 9/2015 | Saurabh et al. |
| 9,141,665 B1 | 9/2015 | Munro et al. |
| 9,173,801 B2 | 11/2015 | Merza |
| 9,185,007 B2 | 11/2015 | Fletcher et al. |
| 9,215,240 B2 | 12/2015 | Merza et al. |
| 9,244,999 B2 | 1/2016 | Jin et al. |
| 9,248,068 B2 | 2/2016 | Merza |
| 9,256,467 B1 | 2/2016 | Singh et al. |
| 9,262,519 B1 | 2/2016 | Saurabh |
| 9,286,413 B1 | 3/2016 | Coates et al. |
| 9,292,620 B1 | 3/2016 | Hoover et al. |
| 9,336,327 B2 | 5/2016 | Melnik et al. |
| 9,342,571 B1 | 5/2016 | Kurtic et al. |
| 9,378,088 B1 | 6/2016 | Piszczek et al. |
| 9,426,045 B2 | 8/2016 | Fletcher et al. |
| 9,426,172 B2 | 8/2016 | Merza |
| 9,432,396 B2 | 8/2016 | Merza |
| 9,438,470 B2 | 9/2016 | Brady, Jr. et al. |
| 9,438,515 B2 | 9/2016 | McCormick et al. |
| 9,489,385 B1 | 11/2016 | Ladola |
| 9,495,427 B2 | 11/2016 | Adabi et al. |
| 9,514,146 B1 | 12/2016 | Wallace et al. |
| 9,514,189 B2 | 12/2016 | Bitincka et al. |
| 9,558,194 B1 | 1/2017 | Srivastav et al. |
| 9,589,012 B2 | 3/2017 | Neels et al. |
| 9,619,581 B2 | 4/2017 | Hughes et al. |
| 9,621,636 B1 | 4/2017 | McVeety et al. |
| 9,672,116 B1 | 6/2017 | Chopra et al. |
| 9,672,274 B1 | 6/2017 | Goo |
| 9,722,951 B2 | 8/2017 | Almadi |
| 9,734,180 B1 | 8/2017 | Graham et al. |
| 9,753,935 B1 | 9/2017 | Tobin et al. |
| 9,779,015 B1 | 10/2017 | Oikarinen et al. |
| 9,806,978 B2 | 10/2017 | McAlister et al. |
| 9,838,292 B2 | 12/2017 | Polychronis |
| 9,900,397 B1 | 2/2018 | Cope et al. |
| 9,959,062 B1 | 5/2018 | Piszczek et al. |
| 9,984,128 B2 | 5/2018 | Vasan et al. |
| 9,990,386 B2 | 6/2018 | Marquardt et al. |
| 9,992,741 B2 | 6/2018 | Trainin et al. |
| 9,996,400 B2 | 6/2018 | Nakagawa et al. |
| 10,025,795 B2 | 7/2018 | Fokoue-Nkoutche et al. |
| 10,031,922 B2 | 7/2018 | Fokoue-Nkoutche et al. |
| 10,037,341 B1 | 7/2018 | Bassov et al. |
| 10,049,160 B2 | 8/2018 | Bitincka et al. |
| 10,091,100 B1 | 10/2018 | Duerk |
| 10,095,993 B1 | 10/2018 | Bar-Menachem et al. |
| 10,120,898 B1 | 11/2018 | Betawadkar-Norwood et al. |
| 10,127,258 B2 | 11/2018 | Lamas et al. |
| 10,142,204 B2 | 11/2018 | Nickolov et al. |
| 10,169,465 B2 | 1/2019 | Andrews et al. |
| 10,216,774 B2 | 2/2019 | Dang et al. |
| 10,318,491 B1 | 6/2019 | Graham et al. |
| 10,318,511 B2 | 6/2019 | De Smet et al. |
| 10,320,638 B1 | 6/2019 | Lauinger et al. |
| 10,353,965 B2 | 7/2019 | Pal et al. |
| 10,437,653 B2 | 10/2019 | Cyr et al. |
| 10,445,311 B1 | 10/2019 | Saurabh et al. |
| 10,452,632 B1 | 10/2019 | Simmen et al. |
| 10,474,723 B2 | 11/2019 | Hodge et al. |
| 10,528,599 B1 | 1/2020 | Pandis et al. |
| 10,534,794 B2 | 1/2020 | Dageville et al. |
| 10,558,656 B2 | 2/2020 | Wells et al. |

(56)            References Cited

U.S. PATENT DOCUMENTS

| | | | |
|---|---|---|---|
| 10,585,951 B2 | 3/2020 | Bhattacharjee et al. | |
| 10,592,561 B2 | 3/2020 | Bhattacharjee et al. | |
| 10,592,562 B2 | 3/2020 | Pal et al. | |
| 10,592,563 B2 | 3/2020 | Pal et al. | |
| 10,599,662 B2 | 3/2020 | Constantino et al. | |
| 10,599,723 B2 | 3/2020 | Bhattacharjee et al. | |
| 10,599,724 B2 | 3/2020 | Pal et al. | |
| 10,606,856 B2 | 3/2020 | Bath et al. | |
| 10,657,061 B1 | 5/2020 | Marriner | |
| 10,657,146 B2 | 5/2020 | Bath et al. | |
| 10,706,056 B1 | 7/2020 | Lin et al. | |
| 10,726,009 B2 | 7/2020 | Pal et al. | |
| 10,769,148 B1 | 9/2020 | Binkert et al. | |
| 10,776,355 B1 | 9/2020 | Bataskis et al. | |
| 10,776,374 B2 | 9/2020 | Valine et al. | |
| 10,795,884 B2 | 10/2020 | Bhattacharjee et al. | |
| 10,896,182 B2 | 1/2021 | Bhattacharjee et al. | |
| 10,956,415 B2 | 3/2021 | Pal et al. | |
| 10,977,260 B2 | 4/2021 | Pal et al. | |
| 10,984,044 B1 | 4/2021 | Batsakis et al. | |
| 10,999,164 B1 | 5/2021 | Sridhar et al. | |
| 11,003,714 B1 | 5/2021 | Batsakis et al. | |
| 11,010,435 B2 | 5/2021 | Pal et al. | |
| 11,023,463 B2 | 6/2021 | Pal et al. | |
| 11,023,539 B2 | 6/2021 | Pal et al. | |
| 11,080,345 B2 | 8/2021 | Pal et al. | |
| 11,100,106 B1 | 8/2021 | Sainanee et al. | |
| 11,106,734 B1 | 8/2021 | Batsakis et al. | |
| 11,113,274 B1 | 9/2021 | Thiel et al. | |
| 11,126,632 B2 | 9/2021 | Pal et al. | |
| 11,151,137 B2 | 10/2021 | Bhattacharjee et al. | |
| 11,163,758 B2 | 11/2021 | James et al. | |
| 11,176,208 B2 | 11/2021 | Pal et al. | |
| 11,222,066 B1 | 1/2022 | Batsakis et al. | |
| 11,232,100 B2 | 1/2022 | Bhattacharjee et al. | |
| 11,238,112 B2 | 2/2022 | Hodge et al. | |
| 11,243,963 B2 | 2/2022 | Pal et al. | |
| 11,250,056 B1 | 2/2022 | Batsakis et al. | |
| 11,269,939 B1 | 3/2022 | Sammer et al. | |
| 11,281,706 B2 | 3/2022 | Pal et al. | |
| 11,294,941 B1 | 4/2022 | Sammer et al. | |
| 11,314,753 B2 | 4/2022 | Pal et al. | |
| 11,321,321 B2 | 5/2022 | Bhattacharjee et al. | |
| 11,334,543 B1 | 5/2022 | Anwar et al. | |
| 11,341,131 B2 | 5/2022 | Pal et al. | |
| 11,392,654 B2 | 7/2022 | Pal et al. | |
| 11,416,528 B2 | 8/2022 | Pal et al. | |
| 11,442,935 B2 | 9/2022 | Pal et al. | |
| 11,461,334 B2 | 10/2022 | Bhattacharjee et al. | |
| 11,494,380 B2 | 11/2022 | Rao et al. | |
| 11,500,875 B2 | 11/2022 | Bhattacharjee et al. | |
| 11,537,311 B1 | 12/2022 | Dhupelia et al. | |
| 11,550,847 B1 | 1/2023 | Batsakis et al. | |
| 11,562,023 B1 | 1/2023 | Batsakis et al. | |
| 11,567,993 B1 | 1/2023 | Batsakis et al. | |
| 11,580,107 B2 | 2/2023 | Pal et al. | |
| 11,586,627 B2 | 2/2023 | Bhattacharjee et al. | |
| 11,586,692 B2 | 2/2023 | Bhattacharjee et al. | |
| 11,593,377 B2 | 2/2023 | Bhattacharjee et al. | |
| 11,593,477 B1 | 2/2023 | Thimmegowda et al. | |
| 11,599,541 B2 | 3/2023 | Pal et al. | |
| 11,604,795 B2 | 3/2023 | Pal et al. | |
| 11,615,087 B2 | 3/2023 | Pal et al. | |
| 11,615,104 B2 | 3/2023 | Pal et al. | |
| 11,620,336 B1 | 4/2023 | Batsakis et al. | |
| 11,636,105 B2 | 4/2023 | Pal et al. | |
| 11,663,227 B2 | 5/2023 | Pal et al. | |
| 11,704,313 B1 | 7/2023 | Andrade et al. | |
| 11,720,537 B2 | 8/2023 | Anwar et al. | |
| 11,797,618 B2 | 10/2023 | Pal et al. | |
| 11,860,874 B2 | 1/2024 | Bhattacharjee et al. | |
| 11,860,940 B1 | 1/2024 | Batsakis et al. | |
| 11,874,691 B1 | 1/2024 | Batsakis et al. | |
| 11,921,672 B2 | 3/2024 | Pal et al. | |
| 11,922,222 B1 | 3/2024 | Chawla et al. | |
| 11,966,391 B2 | 4/2024 | Pal et al. | |
| 11,989,194 B2 | 5/2024 | Bhattacharjee et al. | |
| 11,995,079 B2 | 5/2024 | Pal et al. | |
| 12,007,996 B2 | 6/2024 | Rao et al. | |
| 12,013,895 B2 | 6/2024 | Batsakis et al. | |
| 12,072,939 B1 | 8/2024 | Batsakis et al. | |
| 12,093,272 B1 | 9/2024 | Batsakis et al. | |
| 12,118,009 B2 | 10/2024 | Bhattacharjee et al. | |
| 2001/0016821 A1 | 8/2001 | DeBusk et al. | |
| 2002/0070968 A1 | 6/2002 | Austin et al. | |
| 2002/0112123 A1 | 8/2002 | Becker et al. | |
| 2002/0138471 A1 | 9/2002 | Dutta et al. | |
| 2002/0152299 A1 | 10/2002 | Traversat et al. | |
| 2002/0198869 A1 | 12/2002 | Barnett | |
| 2003/0014403 A1 | 1/2003 | Chandrasekar et al. | |
| 2003/0066033 A1 | 4/2003 | Direen et al. | |
| 2003/0106015 A1 | 6/2003 | Chu et al. | |
| 2003/0120682 A1 | 6/2003 | Bestgen et al. | |
| 2003/0120723 A1 | 6/2003 | Bright et al. | |
| 2003/0130993 A1 | 7/2003 | Mendelevitch et al. | |
| 2003/0154238 A1 | 8/2003 | Murphy et al. | |
| 2003/0167270 A1 | 9/2003 | Werme et al. | |
| 2003/0188198 A1 | 10/2003 | Holdsworth et al. | |
| 2003/0229620 A1 | 12/2003 | Carlson et al. | |
| 2004/0117345 A1 | 6/2004 | Bamford et al. | |
| 2004/0122845 A1 | 6/2004 | Lohman et al. | |
| 2004/0143604 A1 | 7/2004 | Glenner et al. | |
| 2004/0215664 A1* | 10/2004 | Hennings | G06F 16/957 |
| 2004/0230571 A1 | 11/2004 | Robertson | |
| 2005/0022047 A1 | 1/2005 | Chandrasekaran | |
| 2005/0027796 A1 | 2/2005 | San Andres et al. | |
| 2005/0066027 A1 | 3/2005 | Hakiel et al. | |
| 2005/0102325 A1 | 5/2005 | Gould et al. | |
| 2005/0192937 A1 | 9/2005 | Barsness et al. | |
| 2005/0262149 A1* | 11/2005 | Jung | G11B 27/105 |
| 2005/0289232 A1 | 12/2005 | Ebert | |
| 2006/0026211 A1 | 2/2006 | Potteiger | |
| 2006/0074916 A1 | 4/2006 | Beary | |
| 2006/0155720 A1 | 7/2006 | Feinberg | |
| 2006/0161560 A1 | 7/2006 | Khandelwal et al. | |
| 2006/0173993 A1 | 8/2006 | Henseler et al. | |
| 2006/0184998 A1 | 8/2006 | Smith et al. | |
| 2006/0212607 A1 | 9/2006 | Riethmuller | |
| 2006/0224587 A1 | 10/2006 | Zamir et al. | |
| 2006/0224603 A1 | 10/2006 | Correll | |
| 2006/0248045 A1 | 11/2006 | Toledano et al. | |
| 2006/0259460 A1 | 11/2006 | Zurek et al. | |
| 2006/0271504 A1 | 11/2006 | Anderson et al. | |
| 2007/0033155 A1 | 2/2007 | Landsman | |
| 2007/0050328 A1 | 3/2007 | Li et al. | |
| 2007/0100873 A1 | 5/2007 | Yako et al. | |
| 2007/0136311 A1 | 6/2007 | Kasten et al. | |
| 2007/0143261 A1 | 6/2007 | Uppala | |
| 2007/0156842 A1 | 7/2007 | Vermeulen et al. | |
| 2007/0168336 A1 | 7/2007 | Ransil et al. | |
| 2007/0168656 A1 | 7/2007 | Paganetti et al. | |
| 2007/0198641 A1 | 8/2007 | Dorai et al. | |
| 2007/0208669 A1 | 9/2007 | Rivette et al. | |
| 2007/0233672 A1 | 10/2007 | Sanfacon et al. | |
| 2007/0283194 A1 | 12/2007 | Villella et al. | |
| 2008/0010337 A1 | 1/2008 | Hayes et al. | |
| 2008/0033927 A1 | 2/2008 | Richards et al. | |
| 2008/0065591 A1 | 3/2008 | Guzenda | |
| 2008/0071755 A1 | 3/2008 | Barsness et al. | |
| 2008/0114730 A1 | 5/2008 | Larimore et al. | |
| 2008/0133235 A1 | 6/2008 | Simoneau et al. | |
| 2008/0162592 A1 | 7/2008 | Huang et al. | |
| 2008/0172357 A1 | 7/2008 | Rechis et al. | |
| 2008/0192280 A1 | 8/2008 | Masuyama et al. | |
| 2008/0208844 A1 | 8/2008 | Jenkins | |
| 2008/0215546 A1 | 9/2008 | Baum et al. | |
| 2008/0275857 A1 | 11/2008 | Dettinger et al. | |
| 2008/0294660 A1 | 11/2008 | Patterson et al. | |
| 2008/0300835 A1 | 12/2008 | Hixon | |
| 2009/0006148 A1 | 1/2009 | Bacalski et al. | |
| 2009/0006527 A1 | 1/2009 | Gingell et al. | |
| 2009/0007125 A1 | 1/2009 | Barsness et al. | |
| 2009/0125526 A1 | 5/2009 | Neufeld | |
| 2009/0129163 A1 | 5/2009 | Danilak | |

(56) References Cited

U.S. PATENT DOCUMENTS

| | | |
|---|---|---|
| 2009/0132488 A1 | 5/2009 | Wehrmeister et al. |
| 2009/0183162 A1 | 7/2009 | Kindel et al. |
| 2009/0193042 A1 | 7/2009 | Hornibrook et al. |
| 2009/0204551 A1 | 8/2009 | Wang et al. |
| 2009/0216781 A1 | 8/2009 | Chauvet et al. |
| 2009/0234799 A1 | 9/2009 | Betawadkar-Norwood et al. |
| 2009/0248764 A1 | 10/2009 | Day et al. |
| 2009/0284530 A1 | 11/2009 | Lester et al. |
| 2009/0292810 A1 | 11/2009 | Hotta et al. |
| 2009/0327242 A1 | 12/2009 | Brown et al. |
| 2010/0005056 A1 | 1/2010 | Bayliss |
| 2010/0005134 A1 | 1/2010 | Zamir et al. |
| 2010/0005151 A1 | 1/2010 | Gokhale |
| 2010/0011031 A1 | 1/2010 | Huang et al. |
| 2010/0011252 A1 | 1/2010 | Rivoir |
| 2010/0106934 A1 | 4/2010 | Calder et al. |
| 2010/0125565 A1 | 5/2010 | Burger et al. |
| 2010/0153285 A1 | 6/2010 | Anderson et al. |
| 2010/0153375 A1 | 6/2010 | Bilas et al. |
| 2010/0153431 A1 | 6/2010 | Burger |
| 2010/0199042 A1 | 8/2010 | Bates et al. |
| 2010/0229108 A1 | 9/2010 | Gerson et al. |
| 2010/0262740 A1 | 10/2010 | Borchers et al. |
| 2010/0332461 A1 | 12/2010 | Friedman et al. |
| 2011/0047169 A1 | 2/2011 | Leighton et al. |
| 2011/0055231 A1 | 3/2011 | Huck et al. |
| 2011/0060887 A1 | 3/2011 | Thatcher et al. |
| 2011/0078133 A1 | 3/2011 | Bordawekar et al. |
| 2011/0093491 A1 | 4/2011 | Zabback et al. |
| 2011/0099500 A1 | 4/2011 | Smith et al. |
| 2011/0125745 A1 | 5/2011 | Bright |
| 2011/0131200 A1 | 6/2011 | Zhou et al. |
| 2011/0173184 A1 | 7/2011 | Kelshikar et al. |
| 2011/0191373 A1 | 8/2011 | Botros et al. |
| 2011/0196804 A1 | 8/2011 | Sutter et al. |
| 2011/0213765 A1 | 9/2011 | Cui et al. |
| 2011/0213778 A1 | 9/2011 | Hess et al. |
| 2011/0213870 A1 | 9/2011 | Cai et al. |
| 2011/0225192 A1 | 9/2011 | Imig et al. |
| 2011/0231858 A1 | 9/2011 | Sampathkumar et al. |
| 2011/0246294 A1 | 10/2011 | Robb et al. |
| 2011/0289163 A1 | 11/2011 | Edwards et al. |
| 2011/0295838 A1 | 12/2011 | Collins et al. |
| 2011/0295968 A1 | 12/2011 | Takaoka et al. |
| 2011/0320550 A1 | 12/2011 | Lawson et al. |
| 2012/0005308 A1 | 1/2012 | Cok |
| 2012/0066205 A1 | 3/2012 | Chappell et al. |
| 2012/0078869 A1 | 3/2012 | Bellville et al. |
| 2012/0078881 A1 | 3/2012 | Crump et al. |
| 2012/0078975 A1 | 3/2012 | Chen et al. |
| 2012/0079004 A1 | 3/2012 | Herman |
| 2012/0130986 A1 | 5/2012 | Abdellatif et al. |
| 2012/0130988 A1 | 5/2012 | Nica et al. |
| 2012/0130997 A1 | 5/2012 | Risvik et al. |
| 2012/0143873 A1 | 6/2012 | Saadat |
| 2012/0150819 A1 | 6/2012 | Lindahl et al. |
| 2012/0166440 A1 | 6/2012 | Shmueli et al. |
| 2012/0173728 A1 | 7/2012 | Haskins et al. |
| 2012/0197856 A1 | 8/2012 | Banka et al. |
| 2012/0197934 A1 | 8/2012 | Zhang et al. |
| 2012/0226712 A1 | 9/2012 | Vermeulen et al. |
| 2012/0254269 A1 | 10/2012 | Carmichael |
| 2012/0278346 A1 | 11/2012 | Han et al. |
| 2012/0310916 A1 | 12/2012 | Abadi et al. |
| 2012/0331010 A1 | 12/2012 | Christie |
| 2013/0018868 A1 | 1/2013 | Chi et al. |
| 2013/0054649 A1 | 2/2013 | Potapov et al. |
| 2013/0060783 A1 | 3/2013 | Baum et al. |
| 2013/0066674 A1 | 3/2013 | Vasters |
| 2013/0067564 A1 | 3/2013 | Fok Ah Chuen et al. |
| 2013/0084826 A1 | 4/2013 | Mo et al. |
| 2013/0086040 A1 | 4/2013 | Patadia et al. |
| 2013/0091119 A1 | 4/2013 | Huang et al. |
| 2013/0097139 A1 | 4/2013 | Thoresen et al. |
| 2013/0110828 A1 | 5/2013 | Meyerzon et al. |
| 2013/0132392 A1 | 5/2013 | Kenedy et al. |
| 2013/0138626 A1 | 5/2013 | Delafranier et al. |
| 2013/0159251 A1 | 6/2013 | Skrenta et al. |
| 2013/0159324 A1 | 6/2013 | Xu et al. |
| 2013/0166502 A1 | 6/2013 | Walkauskas |
| 2013/0173160 A1 | 7/2013 | Meisels et al. |
| 2013/0173662 A1 | 7/2013 | Kaplinger et al. |
| 2013/0198475 A1 | 8/2013 | Serlet et al. |
| 2013/0204991 A1 | 8/2013 | Skjolsvold et al. |
| 2013/0212165 A1 | 8/2013 | Vermeulen et al. |
| 2013/0226971 A1 | 8/2013 | Shoolman et al. |
| 2013/0232187 A1 | 9/2013 | Workman et al. |
| 2013/0238663 A1 | 9/2013 | Mead et al. |
| 2013/0238706 A1 | 9/2013 | Desai |
| 2013/0246373 A1 | 9/2013 | Hansma et al. |
| 2013/0246608 A1 | 9/2013 | Liu et al. |
| 2013/0254761 A1 | 9/2013 | Reddy et al. |
| 2013/0268832 A1* | 10/2013 | Vemireddy ......... G06F 16/9562 |
| | | 715/206 |
| 2013/0311488 A1 | 11/2013 | Erdogan et al. |
| 2013/0318236 A1 | 11/2013 | Coates et al. |
| 2013/0318536 A1 | 11/2013 | Fletcher et al. |
| 2013/0325850 A1 | 12/2013 | Redmond et al. |
| 2013/0339298 A1 | 12/2013 | Muller et al. |
| 2013/0339567 A1 | 12/2013 | Carpentier et al. |
| 2014/0052733 A1 | 2/2014 | Blank, Jr. et al. |
| 2014/0067759 A1 | 3/2014 | Aguilera et al. |
| 2014/0067792 A1 | 3/2014 | Erdogan et al. |
| 2014/0068343 A1 | 3/2014 | Nakajima et al. |
| 2014/0074810 A1 | 3/2014 | Wang et al. |
| 2014/0089511 A1 | 3/2014 | McLean |
| 2014/0095470 A1 | 4/2014 | Chen et al. |
| 2014/0122117 A1 | 5/2014 | Masarie, Jr. et al. |
| 2014/0129515 A1 | 5/2014 | Venkatesan et al. |
| 2014/0149355 A1 | 5/2014 | Gupta et al. |
| 2014/0156642 A1 | 6/2014 | Johnson et al. |
| 2014/0180651 A1 | 6/2014 | Lysak et al. |
| 2014/0181373 A1 | 6/2014 | George et al. |
| 2014/0188841 A1 | 7/2014 | Sun et al. |
| 2014/0188885 A1 | 7/2014 | Kulkarni et al. |
| 2014/0189858 A1 | 7/2014 | Chen et al. |
| 2014/0195558 A1 | 7/2014 | Murthy et al. |
| 2014/0214799 A1 | 7/2014 | Li et al. |
| 2014/0214811 A1 | 7/2014 | Aramaki |
| 2014/0236889 A1 | 8/2014 | Vasan et al. |
| 2014/0236890 A1* | 8/2014 | Vasan ................. G06F 11/2094 |
| | | 707/610 |
| 2014/0244585 A1 | 8/2014 | Sivasubramanian et al. |
| 2014/0258295 A1 | 9/2014 | Wang et al. |
| 2014/0278652 A1 | 9/2014 | Joyner et al. |
| 2014/0280021 A1 | 9/2014 | Singamshetty |
| 2014/0289414 A1 | 9/2014 | Chan et al. |
| 2014/0317084 A1 | 10/2014 | Chaudhry et al. |
| 2014/0324862 A1 | 10/2014 | Bingham et al. |
| 2014/0359598 A1 | 12/2014 | Oliver et al. |
| 2014/0379691 A1 | 12/2014 | Teletia et al. |
| 2014/0380322 A1 | 12/2014 | Ailamaki et al. |
| 2015/0019537 A1 | 1/2015 | Neels et al. |
| 2015/0039641 A1 | 2/2015 | Neeman et al. |
| 2015/0039650 A1 | 2/2015 | Andrews et al. |
| 2015/0039757 A1 | 2/2015 | Petersen et al. |
| 2015/0049163 A1 | 2/2015 | Smurro |
| 2015/0052125 A1 | 2/2015 | Ellis et al. |
| 2015/0058293 A1 | 2/2015 | Kobayashi et al. |
| 2015/0074819 A1 | 3/2015 | Borenstein |
| 2015/0095570 A1 | 4/2015 | Lee |
| 2015/0100412 A1 | 4/2015 | Sterns et al. |
| 2015/0100616 A1 | 4/2015 | Imamura |
| 2015/0112966 A1 | 4/2015 | Tokuda et al. |
| 2015/0113162 A1 | 4/2015 | Chan et al. |
| 2015/0120684 A1 | 4/2015 | Bawaskar et al. |
| 2015/0134795 A1 | 5/2015 | Theimer et al. |
| 2015/0134796 A1 | 5/2015 | Theimer et al. |
| 2015/0149440 A1 | 5/2015 | Bornea et al. |
| 2015/0149501 A1 | 5/2015 | Prakash et al. |
| 2015/0149507 A1 | 5/2015 | Imaki |
| 2015/0149509 A1 | 5/2015 | Leu et al. |
| 2015/0149879 A1 | 5/2015 | Miller et al. |
| 2015/0161211 A1 | 6/2015 | Patel et al. |

(56)                    References Cited

U.S. PATENT DOCUMENTS

| | | |
|---|---|---|
| 2015/0161237 A1 | 6/2015 | Agarwal et al. |
| 2015/0161239 A1 | 6/2015 | Stepinski et al. |
| 2015/0169684 A1 | 6/2015 | Li et al. |
| 2015/0169686 A1 | 6/2015 | Eliás et al. |
| 2015/0169786 A1 | 6/2015 | Jerzak et al. |
| 2015/0172148 A1 | 6/2015 | Ishida et al. |
| 2015/0180891 A1 | 6/2015 | Seward et al. |
| 2015/0188969 A1 | 7/2015 | Boshev et al. |
| 2015/0189033 A1 | 7/2015 | Han et al. |
| 2015/0199267 A1 | 7/2015 | Oh et al. |
| 2015/0199347 A1 | 7/2015 | Shnitko et al. |
| 2015/0207857 A1 | 7/2015 | Horton |
| 2015/0213631 A1 | 7/2015 | Vander Broek |
| 2015/0220601 A1 | 8/2015 | Leyba |
| 2015/0227624 A1 | 8/2015 | Busch et al. |
| 2015/0234682 A1 | 8/2015 | Dageville et al. |
| 2015/0244795 A1 | 8/2015 | Cantwell et al. |
| 2015/0254245 A1 | 9/2015 | Marais et al. |
| 2015/0254346 A1 | 9/2015 | Chang et al. |
| 2015/0295796 A1 | 10/2015 | Hsiao et al. |
| 2015/0295848 A1 | 10/2015 | Vlachogiannis et al. |
| 2015/0304879 A1 | 10/2015 | daCosta |
| 2015/0319256 A1 | 11/2015 | Casey |
| 2015/0324433 A1 | 11/2015 | Duffy et al. |
| 2015/0339312 A1 | 11/2015 | Lin et al. |
| 2015/0339357 A1 | 11/2015 | Carasso et al. |
| 2015/0341212 A1 | 11/2015 | Hsiao et al. |
| 2015/0347443 A1 | 12/2015 | Reid et al. |
| 2015/0347993 A1 | 12/2015 | Redmond et al. |
| 2015/0356153 A1 | 12/2015 | Schoening |
| 2015/0358433 A1 | 12/2015 | Parthasarathy et al. |
| 2015/0381725 A1 | 12/2015 | Haapaoja et al. |
| 2016/0026438 A1 | 1/2016 | Wolfram |
| 2016/0026684 A1 | 1/2016 | Mukherjee et al. |
| 2016/0027041 A1 | 1/2016 | Zhong et al. |
| 2016/0042039 A1 | 2/2016 | Kaufmann et al. |
| 2016/0044108 A1 | 2/2016 | Vermeulen et al. |
| 2016/0048408 A1 | 2/2016 | Madhu et al. |
| 2016/0050129 A1 | 2/2016 | Hoyne |
| 2016/0050261 A1 | 2/2016 | McDaid et al. |
| 2016/0055184 A1 | 2/2016 | Fokoue-Nkoutche et al. |
| 2016/0063037 A1 | 3/2016 | Savkli |
| 2016/0063209 A1 | 3/2016 | Malaviya |
| 2016/0070750 A1 | 3/2016 | Beutlberger et al. |
| 2016/0085639 A1 | 3/2016 | Abouzour et al. |
| 2016/0085810 A1 | 3/2016 | de Castro Alves et al. |
| 2016/0087880 A1 | 3/2016 | Shalita et al. |
| 2016/0092493 A1 | 3/2016 | Ko et al. |
| 2016/0092541 A1 | 3/2016 | Liu et al. |
| 2016/0092558 A1 | 3/2016 | Ago et al. |
| 2016/0092570 A1 | 3/2016 | Ago et al. |
| 2016/0092588 A1 | 3/2016 | Li |
| 2016/0110109 A1 | 4/2016 | Cowling et al. |
| 2016/0112531 A1 | 4/2016 | Milton et al. |
| 2016/0117129 A1 | 4/2016 | Shrader et al. |
| 2016/0117373 A1 | 4/2016 | Dang et al. |
| 2016/0139849 A1 | 5/2016 | Chaw et al. |
| 2016/0140174 A1 | 5/2016 | Weyerhaeuser et al. |
| 2016/0140196 A1 | 5/2016 | Kobayashi et al. |
| 2016/0150002 A1 | 5/2016 | Hildrum et al. |
| 2016/0156579 A1 | 6/2016 | Kaufmann |
| 2016/0162478 A1 | 6/2016 | Blassin et al. |
| 2016/0170987 A1 | 6/2016 | Kesselman |
| 2016/0180557 A1 | 6/2016 | Yousaf et al. |
| 2016/0188669 A1 | 6/2016 | Duffy et al. |
| 2016/0188742 A1 | 6/2016 | Ingvoldstad et al. |
| 2016/0203135 A1 | 7/2016 | Bhattacharjee et al. |
| 2016/0210340 A1 | 7/2016 | Cai et al. |
| 2016/0212007 A1 | 7/2016 | Alatorre et al. |
| 2016/0253361 A1 | 9/2016 | Nguyen et al. |
| 2016/0283511 A1 | 9/2016 | Fokoue-Nkoutche et al. |
| 2016/0283528 A1 | 9/2016 | Benke et al. |
| 2016/0286013 A1 | 9/2016 | Yu et al. |
| 2016/0291942 A1 | 10/2016 | Hutchison |
| 2016/0292166 A1 | 10/2016 | Russel |
| 2016/0306849 A1 | 10/2016 | Curino et al. |
| 2016/0316014 A1 | 10/2016 | Radu et al. |
| 2016/0335062 A1 | 11/2016 | Teodorescu et al. |
| 2016/0335352 A1 | 11/2016 | Teodorescu et al. |
| 2016/0343093 A1 | 11/2016 | Riland et al. |
| 2016/0357828 A1 | 12/2016 | Tobin et al. |
| 2016/0364093 A1 | 12/2016 | Denton et al. |
| 2016/0364424 A1 | 12/2016 | Chang et al. |
| 2016/0371356 A1 | 12/2016 | Lee et al. |
| 2016/0373521 A1 | 12/2016 | Washbrook et al. |
| 2017/0006135 A1 | 1/2017 | Siebel et al. |
| 2017/0010947 A1 | 1/2017 | Lu et al. |
| 2017/0011039 A1 | 1/2017 | Spaulding et al. |
| 2017/0012909 A1 | 1/2017 | Lieu |
| 2017/0024390 A1 | 1/2017 | Vuppala et al. |
| 2017/0024912 A1 | 1/2017 | de Castro Alves et al. |
| 2017/0026441 A1 | 1/2017 | Moudy et al. |
| 2017/0031599 A1 | 2/2017 | Bowman et al. |
| 2017/0031937 A1 | 2/2017 | Bowman et al. |
| 2017/0031988 A1 | 2/2017 | Sun et al. |
| 2017/0034023 A1 | 2/2017 | Nickolov et al. |
| 2017/0039239 A1 | 2/2017 | Saadat-Panah et al. |
| 2017/0046374 A1 | 2/2017 | Fletcher et al. |
| 2017/0046445 A1 | 2/2017 | Cormier et al. |
| 2017/0060903 A1 | 3/2017 | Botea et al. |
| 2017/0061286 A1 | 3/2017 | Kumar et al. |
| 2017/0068678 A1 | 3/2017 | Tripathi et al. |
| 2017/0083368 A1 | 3/2017 | Bishop et al. |
| 2017/0083386 A1 | 3/2017 | Wing et al. |
| 2017/0083588 A1 | 3/2017 | Lang et al. |
| 2017/0097957 A1 | 4/2017 | Bourbonnais et al. |
| 2017/0103116 A1 | 4/2017 | Hu et al. |
| 2017/0111675 A1 | 4/2017 | Song et al. |
| 2017/0116289 A1 | 4/2017 | Deshmukh et al. |
| 2017/0124151 A1 | 5/2017 | Ji et al. |
| 2017/0147224 A1 | 5/2017 | Kumar et al. |
| 2017/0147640 A1 | 5/2017 | Gaza et al. |
| 2017/0149624 A1 | 5/2017 | Chitti et al. |
| 2017/0149625 A1 | 5/2017 | Chitti et al. |
| 2017/0154057 A1 | 6/2017 | Wu et al. |
| 2017/0169336 A1 | 6/2017 | Singhal et al. |
| 2017/0170990 A1 | 6/2017 | Gaddehosur et al. |
| 2017/0177697 A1 | 6/2017 | Lee et al. |
| 2017/0178253 A1 | 6/2017 | Koufogiannakis et al. |
| 2017/0180289 A1 | 6/2017 | Chiappone et al. |
| 2017/0185574 A1 | 6/2017 | Fern et al. |
| 2017/0185648 A1 | 6/2017 | Kavulya et al. |
| 2017/0199910 A1 | 7/2017 | Konik et al. |
| 2017/0213257 A1 | 7/2017 | Murugesan et al. |
| 2017/0219357 A1 | 8/2017 | Pfeifle |
| 2017/0220685 A1 | 8/2017 | Yan et al. |
| 2017/0228257 A1 | 8/2017 | Dong et al. |
| 2017/0228460 A1 | 8/2017 | Amel et al. |
| 2017/0242630 A1 | 8/2017 | Kephart et al. |
| 2017/0243132 A1 | 8/2017 | Sainani et al. |
| 2017/0255790 A1 | 9/2017 | Barrett et al. |
| 2017/0262551 A1 | 9/2017 | Cho et al. |
| 2017/0286507 A1 | 10/2017 | Hosogi et al. |
| 2017/0286518 A1 | 10/2017 | Horowitz et al. |
| 2017/0300536 A1 | 10/2017 | Gupta et al. |
| 2017/0300702 A1 | 10/2017 | Tegegne et al. |
| 2017/0308573 A1 | 10/2017 | Brisebois et al. |
| 2017/0329543 A1 | 11/2017 | Slater et al. |
| 2017/0344609 A1 | 11/2017 | Wadley et al. |
| 2017/0373935 A1 | 12/2017 | Subramanian et al. |
| 2018/0004745 A1 | 1/2018 | Finkelstein et al. |
| 2018/0011655 A1 | 1/2018 | Gredler et al. |
| 2018/0032478 A1 | 2/2018 | Felderman et al. |
| 2018/0032570 A1 | 2/2018 | Miller et al. |
| 2018/0046503 A1 | 2/2018 | Feng et al. |
| 2018/0052765 A1 | 2/2018 | Imbierski |
| 2018/0060325 A1 | 3/2018 | Taylor et al. |
| 2018/0060389 A1 | 3/2018 | Hwang |
| 2018/0060395 A1 | 3/2018 | Pathak et al. |
| 2018/0060399 A1 | 3/2018 | Lee et al. |
| 2018/0060586 A1 | 3/2018 | Xiao et al. |
| 2018/0075097 A1 | 3/2018 | Hwang |
| 2018/0081579 A1 | 3/2018 | Verrilli et al. |
| 2018/0081941 A1 | 3/2018 | Foebel et al. |

(56) References Cited

U.S. PATENT DOCUMENTS

| | | |
|---|---|---|
| 2018/0089265 A1 | 3/2018 | Gerard |
| 2018/0089267 A1 | 3/2018 | Hatem et al. |
| 2018/0089272 A1 | 3/2018 | Bath et al. |
| 2018/0089276 A1 | 3/2018 | Victor et al. |
| 2018/0089324 A1 | 3/2018 | Pal et al. |
| 2018/0113902 A1 | 4/2018 | Chen et al. |
| 2018/0121426 A1 | 5/2018 | Barsness et al. |
| 2018/0123918 A1 | 5/2018 | Steinhauser et al. |
| 2018/0157711 A1 | 6/2018 | Lee |
| 2018/0159782 A1 | 6/2018 | Madan et al. |
| 2018/0165331 A1 | 6/2018 | Zhang et al. |
| 2018/0173753 A1 | 6/2018 | Pei et al. |
| 2018/0173759 A1 | 6/2018 | Barsness et al. |
| 2018/0205672 A1 | 7/2018 | Dong et al. |
| 2018/0218017 A1 | 8/2018 | Milrud |
| 2018/0218045 A1 | 8/2018 | Pal et al. |
| 2018/0225095 A1 | 8/2018 | Kamalakantha et al. |
| 2018/0285417 A1 | 10/2018 | Lazovic et al. |
| 2018/0307735 A1 | 10/2018 | Thayer et al. |
| 2018/0322017 A1 | 11/2018 | Maccanti et al. |
| 2018/0322168 A1 | 11/2018 | Levine et al. |
| 2018/0348715 A1 | 12/2018 | Bandaru et al. |
| 2018/0349095 A1 | 12/2018 | Wu et al. |
| 2018/0373756 A1 | 12/2018 | Madala |
| 2019/0005044 A1 | 1/2019 | Bell |
| 2019/0028571 A1 | 1/2019 | Tomiyama |
| 2019/0042146 A1 | 2/2019 | Wysoczanski et al. |
| 2019/0050579 A1 | 2/2019 | Abraham et al. |
| 2019/0065278 A1 | 2/2019 | Jeuk et al. |
| 2019/0065553 A1 | 2/2019 | Young et al. |
| 2019/0095241 A1 | 3/2019 | Ago et al. |
| 2019/0098106 A1 | 3/2019 | Mungel et al. |
| 2019/0109848 A1 | 4/2019 | Clark et al. |
| 2019/0138642 A1 | 5/2019 | Pal et al. |
| 2019/0179805 A1* | 6/2019 | Prahlad ............... H04L 67/1095 |
| 2019/0229924 A1 | 7/2019 | Chhabra et al. |
| 2019/0236182 A1 | 8/2019 | Tiyyagura et al. |
| 2019/0236203 A1 | 8/2019 | De Boer |
| 2019/0294344 A1 | 9/2019 | Hahn et al. |
| 2019/0303453 A1* | 10/2019 | Stringham ........ G06F 16/90335 |
| 2019/0340291 A1 | 11/2019 | Raman et al. |
| 2019/0349426 A1 | 11/2019 | Smith et al. |
| 2019/0379650 A1 | 12/2019 | Hale et al. |
| 2020/0050586 A1 | 2/2020 | Pal et al. |
| 2020/0050607 A1 | 2/2020 | Pal et al. |
| 2020/0057818 A1 | 2/2020 | Kim |
| 2020/0082010 A1 | 3/2020 | Bodziony et al. |
| 2020/0133916 A1 | 4/2020 | Liao et al. |
| 2020/0301941 A1 | 9/2020 | Wilson et al. |
| 2020/0327252 A1 | 10/2020 | McFall et al. |
| 2020/0364141 A1 | 11/2020 | Shinha et al. |
| 2020/0364279 A1* | 11/2020 | Pal .................... G06F 16/24568 |
| 2020/0401591 A1 | 12/2020 | Bhoite et al. |
| 2020/0409948 A1 | 12/2020 | Corvinelli et al. |
| 2021/0019557 A1 | 1/2021 | Jothi et al. |
| 2021/0034623 A1 | 2/2021 | Sabhanatarajan et al. |
| 2021/0034625 A1 | 2/2021 | Shah et al. |
| 2021/0049177 A1 | 2/2021 | Bhattacharjee et al. |
| 2021/0109902 A1 | 4/2021 | Glasser |
| 2021/0149895 A1 | 5/2021 | Tran et al. |
| 2021/0224051 A1 | 7/2021 | Bequet et al. |
| 2021/0286812 A1 | 9/2021 | Neugebauer et al. |
| 2021/0303570 A1 | 9/2021 | Kondiles et al. |
| 2021/0390103 A1 | 12/2021 | Cejudo et al. |
| 2022/0019577 A1* | 1/2022 | Mehta .................... H04L 67/53 |
| 2022/0019597 A1 | 1/2022 | Takagi et al. |
| 2022/0164349 A1 | 5/2022 | Safaie et al. |
| 2022/0207084 A1 | 6/2022 | Al-Omari et al. |
| 2022/0269727 A1 | 8/2022 | Batsakis et al. |
| 2022/0327125 A1* | 10/2022 | Pal .................... G06F 16/2471 |
| 2023/0072930 A1 | 3/2023 | Shah et al. |
| 2023/0130267 A1 | 4/2023 | Mukherjee et al. |
| 2023/0315757 A1 | 10/2023 | DiPalma et al. |
| 2024/0086471 A1 | 3/2024 | Pal et al. |
| 2024/0168962 A1* | 5/2024 | Lundberg ............ G06F 16/9535 |
| 2024/0178001 A1 | 5/2024 | Li et al. |
| 2024/0220497 A1 | 7/2024 | Pal et al. |
| 2024/0256545 A1 | 8/2024 | James et al. |
| 2024/0320231 A1 | 9/2024 | Bhattacharjee et al. |

FOREIGN PATENT DOCUMENTS

| | | |
|---|---|---|
| CN | 107506447 A | 12/2017 |
| CN | 109299110 A | 2/2019 |
| CN | 109416643 A | 3/2019 |
| EP | 2453370 A1 | 5/2012 |
| EP | 3675418 | 7/2020 |
| KR | 20200004835 | 1/2020 |
| WO | WO 2007/062429 A2 | 5/2007 |
| WO | WO 2020/027867 | 2/2020 |
| WO | WO 2020/220216 | 11/2020 |

OTHER PUBLICATIONS

Beame et al., "Communication Steps for Parallel Query Processing", PODS '13: Proceedings of the 32nd ACM SIGMOD-SIGACT-SIGAI Symposium on Principles of Database Systems; Jun. 2013, pp. 273-284.

Bitincka et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010; 9 pages.

Carraso D., "Exploring Splunk," published by CITO Research, New York, NY, Apr. 2012; 156 pages.

Chen et al., "ParaLite: Supporting Collective Queries in Database System to Parallelize User-Defined Executable," 2012 12th IEEE/ACM International Symposium on Cluster, Clout and Grid Computing, IEEE Computer Society, pp. 474-481, May 2012.

Dayal U., "Of Nests and Trees: A Unified Approach to Processing Queries That Contain Nested Subqueries, Aggregates, and Quantifiers." Proceedings of the 13th Int'l Conference on Very Large Data Bases [VLDB], Brighton, 1987, pp. 197-208.

Di et al., "Social-optimized Win-win Resource Allocation for Self-organizing Cloud". In 2011 IEEE Int Conf on Cloud and Service Computing Dec. 12, 2011; 251-258.

Ejarque et al., "Using Semantics for Resource Allocation in Computing Service Providers". In 2008 IEEE Int Conf on Services Computing Jul. 7, 2008; 2: 583-587.

Friedman, et al., SQL/MapReduce: A Practical Approach to Self-Describing, Polymorphic, and Parallelizable Use-Defined Functions, Proc. VLDB Endow, 12 pp. 1402-1413 Aug. 2009.

Gotz et al., "A methodology for interactive mining and visual analysis of clinical event patterns using electronic health record data". Journal Biomed Info. Apr. 1, 2014;48: 148-159.

Han et al., "Elastic Allocator: An Adaptive Task Scheduler for Streaming Query in the Cloud," IEEE Computer Society—2014, IEEE 8th International Symposium on Service Oriented System Engineering, pp. 284-289, 2014.

Hu et al., Dynamic Optimization of Subquery Processing in Grid Database, Third International Conference on Natural Communication, 6 pages, vol. 5, Nov. 2007.

Huang et al., "Query-aware Locality-sensitive Hashing for Approximate Nearest Neighbor Search", In Proceedings of the VLDB Endowment. Sep. 1, 2015;9(1):1-2 in 12 pages.

Hull et al., "Querying Across Languages: A Dictionary-Based Approach to Multilingual Information Retrieval." Proceedings of the 19th Annual International ACM SIGIR Conference on Research and Development in Information Retrieval Aug. 18, 1996; pp. 49-57.

Jayaram, SQLShack: "SQL Union overview, usage, and examples," https://sqlshack.com/sql/sql-sub-queries.htm. 2021, in 13 pages.

Kafka + Flink: A Practical, How-To Guide, Sep. 2, 2015 by R. Metzger; retrieved from https://www.ververica.com/blog/kafka-flink-a-practical-how-to; 13 pages.

Keystone Real-time Stream Processing Platform, The Netflix Tech Blog, Sep. 10, 2018, retrieved from https://netflixtechblog.com/keystone-real-time-stream-processing-platform-a3ee651812a?gi=71cc12ef6b89.

(56) References Cited

OTHER PUBLICATIONS

Kuo et al., "Query Expansion for Hash-based Image Object Retrieval". In Proceedings of the 17th ACM international conference on Multimedia Oct. 19, 2009 (pp. 65-74).

Limsopatham et al., "Learning to Combine Representations for Medical Records Search". SIGIR'13, Jul. 28-Aug. 1, 2013, ACM 2013; pp. 833-836.

McNamee et al., "Comparing Cross-Language Query Expansion Techniques by Degrading Translation Resources." Proceedings of the 25th Annual International ACM SIGIR Conference on Research and Development in Information Retrieval Aug. 11, 2002; pp. 159-166.

Myers W., "Skating Out the Graphics Display Pipeline". IEEE Computer Graphics & Applications, Jul. 1984;4(7): 60-65.

Nadanam et al., "QoS Evaluation for Web Services In Cloud computing," IEEE, 2012, ICCCNT'12, Jul. 26-28, 2012, Coimbatore, India.

Netflix Keystone SPaaS: Real-time Stream Processing as a Service—ABD320—re:Invent 2017 clip slide, retrieved from https://www.slideshare.net/AmazonWebServices/netflix-keystone-spaas-realtime-stream-processing-as-a-service-abd320-reinvent-2017.

Nguyen et al., "An IndexScheme for Similarity Search on Cloud Computing using MapReduce over Docker Container," IMCOM '16: Proceedings of the 10 International Conference on Ubiquitous Information Management and Communication Jan. 2016 Article No. 60 pp. 1-6 9year: 2016).

Pääkkönen et al., "Reference Architecture and Classification of Technologies, Products and Services for Big Data Systems," Big Data Research vol. 2, Issue 4, Dec. 2015, pp. 166-186.

SLAML 10 Reports, Workshop On Managing Systems via Log Analysis and Machine Learning Techniques. ;login: Feb. 2011—Conference Reports—vol. 36, No. 1, pp. 104-110.

Smith et al., "Distributed Query Processing on the Grid," In Grid Computing—GRID 2002: Third International Workshop Baltimore, MD, USA, Nov. 18, 2002 Proceedings 3 2002 (pp. 279-290). Springer Verlag: Berlin/Heidelberg. (12 pages).

Splunk Enterprise Overview 8.0.0—splunk > turn data into doing—copyright 2020 Splunk Inc.—in 17 pages—Retrieved from Splunk Documentation <URL: https://docs.splunk.com/Documentation> on May 20, 2020; 17 pages.

Splunk Cloud User Manual 8.0.2004—splunk> turn data in doing—copyright 2020 Splunk Inc.—in 66 pages—Retrieved from Splunk Documentation <URL: https://docs.splunk.com/Documentation> on May 20, 2020; 66 pages.

Splunk Quick Reference Guide, updated 2019, available online at https://www.splunk.com/pdfs/solution-guides/splunk-quick-reference-guide.pdf, retrieved May 20, 2020; 6 pages.

"Subqueries with the INSERT Statement," https://www.tutorialspoint.com/sql/sql-sub-queries.htm. (Mar. 8, 2021); 4 pages.

Vaid K., Workshop on Managing Systems via log Analysis and Machine Learning Techniques (SLAML '10), ;login: vol. 36, No. 1, Oct. 3, 2010, Vancouver, BC, Canada; 7 pages.

Wongsuphasawat et al., "Querying event sequences by exact match or similarity search: Design and empirical evaluation". Interacting with Computers. Mar. 1, 2012;24(2): 55-68.

Wu S., Building Stream Processing as a Service (SPaaS), retrieved from https://cdn.oreillystatic.com/en/assets/1/event/281/Building%20stream%20processing%20as%20a%20service%20at%20Netflix%20Presentation.pdf. Netflix Presentation Dec. 2017; 113 pages.

Yasu et al., Performance of Splunk for the TDAQ Information Service at the ATLAS Experiment, 2014 19th IEEE—NPSS Real Time Conference, 6 pages, May 2014.

Zhu et al., "Combining Multi-level Evidence for Medical Record Retrieval". SHB'12, Oct. 29, 2012, ACM 2012; pp. 49-56.

U.S. Appl. No. 15/967,570, filed Apr. 30, 2018, Sammer et al.

U.S. Appl. No. 15/967,582, filed Apr. 30, 2018, Batsakis et al.

U.S. Appl. No. 15/967,586, filed Apr. 30, 2018, Batsakis et al.

U.S. Appl. No. 15/967,595, filed Apr. 30, 2018, Batsakis et al.

U.S. Appl. No. 16/430,983, filed Jun. 4, 2019, Pal et al.

U.S. Appl. No. 17/445,701, filed Aug. 23, 2021, Batsakis et al.

U.S. Appl. No. 17/661,529, filed Apr. 29, 2022, Rao B.

U.S. Appl. No. 17/816,254, filed Jul. 29, 2022, Arora et al.

U.S. Appl. No. 18/326,802, filed May 31, 2023, Andrade et al.

U.S. Appl. No. 18/342,671, filed Jun. 27, 2023, Chawla et al.

U.S. Appl. No. 18/496,759, filed Oct. 27, 2023, Bhattacharjee et al.

U.S. Appl. No. 18/420,173, filed Jan. 23, 2024, Pal et al.

U.S. Appl. No. 18/609,798, filed Mar. 19, 2024, Pal et al.

U.S. Appl. No. 18/748,595, filed Jun. 20, 2024, Batsakis et al.

U.S. Appl. No. 18/773,273, filed Jul. 15, 2024, Batsakis et al.

U.S. Appl. No. 18/428,428, filed Jan. 31, 2024, Davis et al.

U.S. Appl. No. 18/428,372, filed Jan. 31, 2024, Davis et al.

U.S. Appl. No. 18/428,405, filed Jan. 31, 2024, Davis et al.

U.S. Appl. No. 18/429,156, filed Jan. 31, 2024, Frenkel et al.

U.S. Appl. No. 18/888,003, filed Sep. 17, 2024, Bhattacharjee et al.

U.S. Appl. No. 18/907,894, filed Oct. 7, 2024, Arora et al.

Iwan.Aucamp. (Apr. 3, 2023). In Wikipedia. "Apache Parquet." Retrieved Sep. 7, 2024 from <https://en.wikipedia.org/w/index.php?title=Apache_Parquet&oldid=1147991874>. 4 pages.

International Search Report and Written Opinion mailed Nov. 15, 2024 in International Application No. PCT/US2024/038251. 10 pages.

* cited by examiner

800

RECEIVE, FROM AN EXTERNAL LOCATION, A SET OF DATA
802

PROCESS THE SET OF DATA
804

GENERATE AN INDEX ASSOCIATED WITH THE SET OF DATA
806

STORE THE INDEX AND AN IDENTIFIER OF THE EXTERNAL LOCATION IN ONE OR MORE BUCKETS OF A DATA STORE
808

EXTERNALLY DISTRIBUTED BUCKETS FOR EXECUTION OF QUERIES

RELATED APPLICATIONS

Any and all applications for which a foreign or domestic priority claim is identified in the Application Data Sheet as filed with the present application are incorporated by reference under 37 CFR 1.57 and made a part of this specification. This application claims the benefit of priority of U.S. Provisional Patent Application No. 63/514,064, filed Jul. 17, 2023, entitled EXTERNAL JOURNAL, which is incorporated herein by reference in its entirety.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems preprocess data based on anticipated data analysis needs. In particular, specified data items may be extracted from the generated data and stored in a data system to facilitate efficient retrieval and analysis of those data items at a later time. At least some of the remainder of the generated data is typically discarded during preprocessing.

Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

The present disclosure is illustrated by way of example, and not limitation, in the figures of the accompanying drawings, in which like reference numerals indicate similar elements and in which.

DETAILED DESCRIPTION

1.0. General Overview

Figure 1:
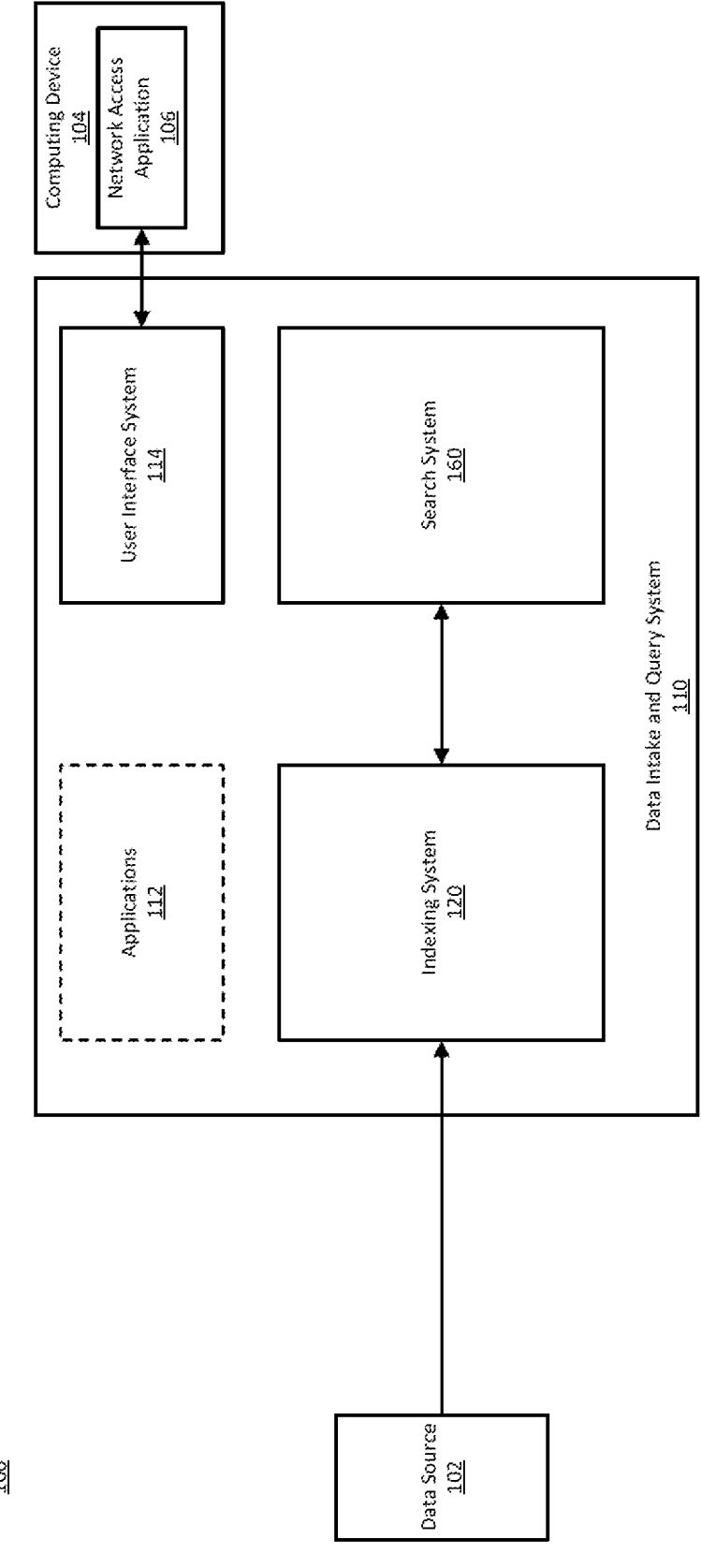
FIG. 1 is a block diagram of an example computing environment, in accordance with example embodiments.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (Saas) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment.

As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

FIG. 1 is a block diagram illustrating an example computing environment 100 that includes a data intake and query system 110. The data intake and query system 110 obtains data from a data source 102 in the computing environment 100, and ingests the data using an indexing system 120. A search system 160 of the data intake and query system 110 enables users to navigate the indexed data. Though drawn with separate boxes in FIG. 1, in some implementations the indexing system 120 and the search system 160 can have overlapping components. A computing device 104, running a network access application 106, can communicate with the data intake and query system 110 through a user interface system 114 of the data intake and query system 110. Using the computing device 104, a user can perform various operations with respect to the data intake and query system 110, such as administration of the data intake and query system 110, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 110 can further optionally include applications 112 that extend the search, analytics, and/or visualization capabilities of the data intake and query system 110.

The data intake and query system 110 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 110 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 110 can be executed on a single computing device, or execution of the program code can be distributed over multiple computing devices. For example, the program code can include instructions for both indexing and search components (which may be part of the indexing system 120 and/or the search system 160, respectively), which can be executed on a computing device that also provides the data source 102. As another example, the program code can be executed on one computing device, where execution of the program code provides both indexing and search components, while another copy of the program code executes on a second computing device that provides the data source 102. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 102 of the computing environment 100 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 102 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 120 obtains machine date from the data source 102 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index may identify portions of the events (e.g., keywords). The indexing system 120 does not require prior knowledge of the structure of incoming data (e.g., the indexing system 120 does not need to be provided with a schema describing the data). Additionally, the indexing system 120 retains a copy of the data as it was received by the indexing system 120 such that the original data is always available for searching (e.g., no data is discarded, though, in some examples, the indexing system 120 can be configured to do so).

The search system 160 searches the data stored by the indexing system 120. As discussed in greater detail below, the search system 160 enables users associated with the computing environment 100 (and possibly also other users) to navigate the data, generate reports, and visualize search results in "dashboards" output using a graphical interface. Using the facilities of the search system 160, users can obtain insights about the data, such as keywords, calculating metrics, searching for specific conditions within a rolling time window, identifying patterns in the data, and predicting future trends, among other examples. To achieve greater efficiency, the search system 160 can apply map-reduce methods to parallelize searching of large volumes of data. Additionally, because the original data is available, the search system 160 can apply a schema to the data at search time. This allows different structures to be applied to the same data, or for the structure to be modified if or when the content of the data changes. Application of a schema at search time may be referred to herein as a late-binding schema technique.

The user interface system 114 provides mechanisms through which users associated with the computing environment 100 (and possibly others) can interact with the data intake and query system 110. These interactions can include configuration, administration, and management of the indexing system 120, initiation and/or scheduling of queries that are to be processed by the search system 160, receipt or reporting of search results, and/or visualization of search results. The user interface system 114 can include, for example, facilities to provide a command line interface or a web-based interface.

Users can access the user interface system 114 using a computing device 104 that communicates with data intake and query system 110, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 100. For example, a person can log in as a particular user and, using the user's digital information, can access the data intake and query system 110. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 104 can provide a human-machine interface through which a person can have a digital presence in the computing environment 100 in the form of a user. The computing device 104 is an electronic device having one or more processors and a memory capable of storing instructions for execution by the one or more processors. The computing device 104 can further include input/output (I/O) hardware and a network interface. Applications executed by the computing device 104 can include a network access application 106, such as a web browser, which can use a network interface of the client computing device 104 to communicate, over a network, with the user interface system 114 of the data intake and query system 110. The user interface system 114 can use the network access application 106 to generate user interfaces that enable a user to interact with the data intake and query system 110. A web browser is one example of a network access application. A shell tool can also be used as a network access application. In some examples, the data intake and query system 110 is an application executing on the computing device 104. In such examples, the network access application 106 can access the user interface system 114 without going over a network.

The data intake and query system 110 can optionally include applications 112. An app of the data intake and query system 110 is a collection of configurations, knowledge objects (a user-defined entity that enriches the data in the data intake and query system 110), views, and dashboards that may provide additional functionality, different techniques for searching the data, and/or additional insights into the data. The data intake and query system 110 can execute multiple applications simultaneously. Example applications include an information technology service intelligence application, which can monitor and analyze the performance and behavior of the computing environment 100, and an enterprise security application, which can include content and searches to assist security analysts in diagnosing and acting on anomalous or malicious behavior in the computing environment 100.

Though FIG. 1 illustrates only one data source, in practical implementations, the computing environment 100 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 100, the data intake and query system 110 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 100 can include on-prem and cloud-based computing resources, or only cloud-based resources. For example, an entity may have on-prem computing devices and a private cloud. In this example, the entity operates the data intake and query system 110 and can choose to execute the data intake and query system 110 on an on-prem computing device or in the cloud. In another example, a provider entity operates the data intake and query system 110 in a public cloud and provides the functionality of the data intake and query system 110 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 110. In some implementations, the entity providing the data intake and query system 110 is itself subscribing to the cloud services of a cloud service provider. As an example, a first entity provides computing resources under a public cloud service model, a second entity subscribes to the cloud services of the first provider entity and uses the cloud computing resources to operate the data intake and query system 110, and a third entity can subscribe to the services of the second provider entity in order to use the functionality of the data intake and query system 110. In this example, the data sources are associated with the third entity, users accessing the data intake and query system 110 are associated with the third entity, and the analytics and insights provided by the data intake and query system 110 are for purposes of the third entity's operations.

Figure 2:
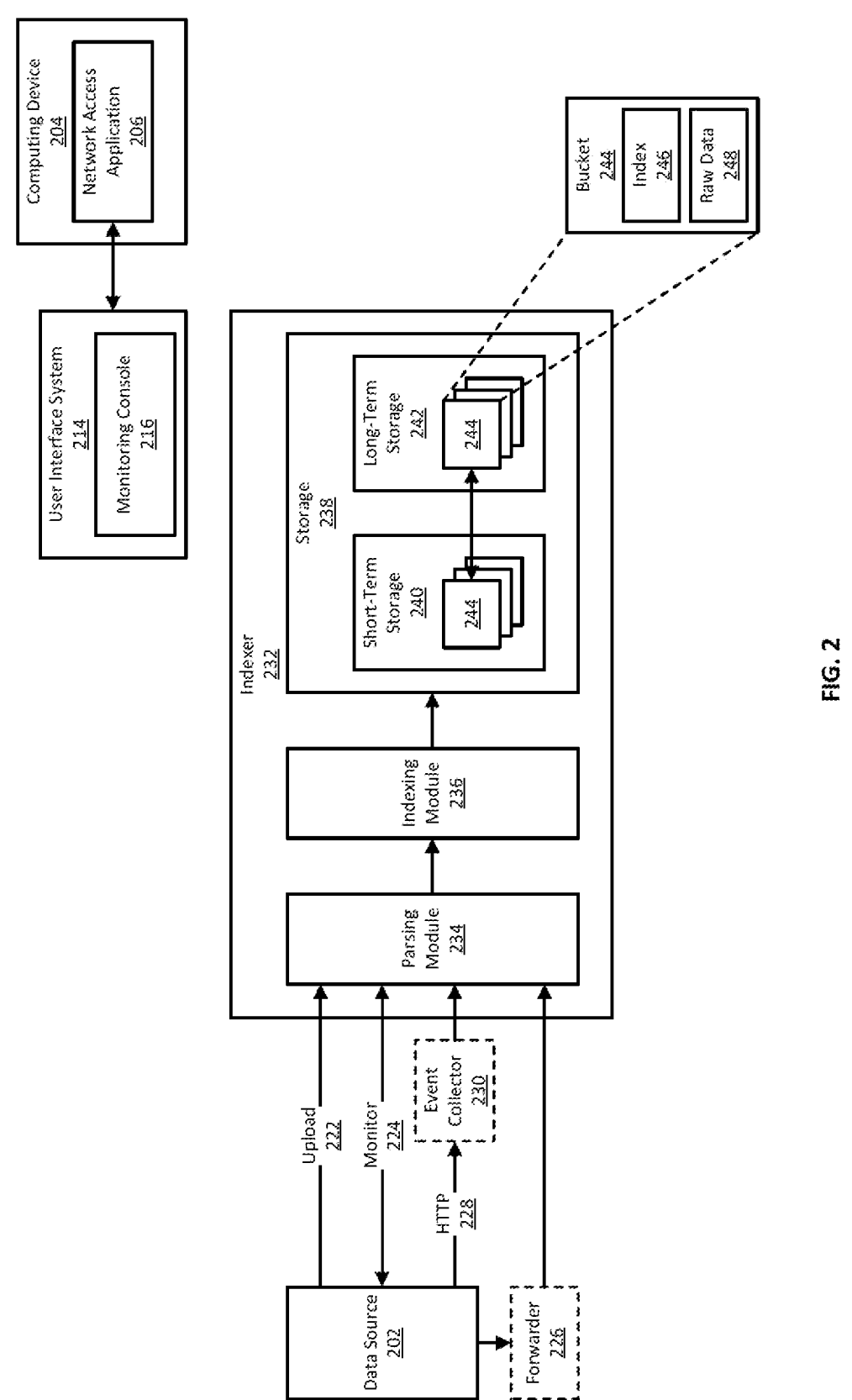
FIG. 2 is a block diagram of an example indexing system, in accordance with example embodiments.

FIG. 2 is a block diagram illustrating in greater detail an example of an indexing system 220 of a data intake and query system, such as the data intake and query system 110 of FIG. 1. The indexing system 220 of FIG. 2 uses various methods to obtain machine data from a data source 202 and stores the data in an index 246 of an indexer 232. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 220 enables the data intake and query system to obtain the machine data produced by the data source 202 and to store the data for searching and retrieval.

Users can administer the operations of the indexing system 220 using a computing device 204 that can access the indexing system 220 through a user interface system 214 of the data intake and query system. For example, the computing device 204 can be executing a network access application 206, such as a web browser or a terminal, through which a user can access a monitoring console 216 provided by the user interface system 214. The monitoring console 216 can enable operations such as: identifying the data source 202 for data ingestion; configuring the indexer 232 to index the data from the data source 202; configuring a data ingestion method; configuring, deploying, and managing clusters of indexers; and viewing the topology and performance of a deployment of the data intake and query system, among other operations. The operations performed by the indexing system 220 may be referred to as "index time" operations, which are distinct from "search time" operations that are discussed further below.

The indexer 232, which may be referred to herein as a data indexing component, coordinates and performs most of the index time operations. The indexer 232 can be implemented using program code that can be executed on a computing device. The program code for the indexer 232 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 232. In some implementations, the indexer 232 executes on the computing device 204 through which a user can access the indexing system 220. In some implementations, the indexer 232 executes on a different computing device than the illustrated computing device 204.

The indexer 232 may be executing on the computing device that also provides the data source 202 or may be executing on a different computing device. In implementations wherein the indexer 232 is on the same computing device as the data source 202, the data produced by the data source 202 may be referred to as "local data." In other implementations the data source 202 is a component of a first computing device and the indexer 232 executes on a second computing device that is different from the first computing device. In these implementations, the data produced by the data source 202 may be referred to as "remote data." In some implementations, the first computing device is "on-prem" and in some implementations the first computing device is "in the cloud." In some implementations, the indexer 232 executes on a computing device in the cloud and the operations of the indexer 232 are provided as a service to entities that subscribe to the services provided by the data intake and query system.

For a given data produced by the data source 202, the indexing system 220 can be configured to use one of several methods to ingest the data into the indexer 232. These methods include upload 222, monitor 224, using a forwarder 226, or using HyperText Transfer Protocol (HTTP 228) and an event collector 230. These and other methods for data ingestion may be referred to as "getting data in" (GDI) methods.

Using the upload 222 method, a user can specify a file for uploading into the indexer 232. For example, the monitoring console 216 can include commands or an interface through which the user can specify where the file is located (e.g., on which computing device and/or in which directory of a file system) and the name of the file. The file may be located at the data source 202 or maybe on the computing device where the indexer 232 is executing. Once uploading is initiated, the indexer 232 processes the file, as discussed further below. Uploading is a manual process and occurs when instigated by a user. For automated data ingestion, the other ingestion methods are used.

The monitor 224 method enables the indexing system to monitor the data source 202 and continuously or periodically obtain data produced by the data source 202 for ingestion by the indexer 232. For example, using the monitoring console 216, a user can specify a file or directory for monitoring. In this example, the indexing system can execute a monitoring process that detects whenever the file or directory is modified and causes the file or directory contents to be sent to the indexer 232. As another example, a user can specify a network port for monitoring. In this example, a monitoring process can capture data received at or transmitting from the network port and cause the data to be sent to the indexer 232. In various examples, monitoring can also be configured for data sources such as operating system event logs, performance data generated by an operating system, operating system registries, operating system directory services, and other data sources.

Monitoring is available when the data source 202 is local to the indexer 232 (e.g., the data source 202 is on the computing device where the indexer 232 is executing). Other data ingestion methods, including forwarding and the event collector 230, can be used for either local or remote data sources.

A forwarder 226, which may be referred to herein as a data forwarding component, is a software process that sends data from the data source 202 to the indexer 232. The forwarder 226 can be implemented using program code that can be executed on the computer device that provides the data source 202. A user launches the program code for the forwarder 226 on the computing device that provides the data source 202. The user can further configure the forwarder 226, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 226 can provide various capabilities. For example, the forwarder 226 can send the data unprocessed or can perform minimal processing on the data before sending the data to the indexer 232. Minimal processing can include, for example, adding metadata tags to the data to identify a source, source type, and/or host, among other information, dividing the data into blocks, and/or applying a timestamp to the data. In some implementations, the forwarder 226 can break the data into individual events (event generation is discussed further below) and send the events to a receiver. Other operations that the forwarder 226 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 230 provides an alternate method for obtaining data from the data source 202. The event collector 230 enables data and application events to be sent to the indexer 232 using HTTP 228. The event collector 230 can be implemented using program code that can be executing on a computing device. The program code may be a component of the data intake and query system or can be a standalone component that can be executed independently of the data intake and query system and operates in cooperation with the data intake and query system.

To use the event collector 230, a user can, for example using the monitoring console 216 or a similar interface provided by the user interface system 214, enable the event collector 230 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 202 as an alternative method to using a username and password for authentication.

To send data to the event collector 230, the data source 202 is supplied with a token and can then send HTTP 228 requests to the event collector 230. To send HTTP 228 requests, the data source 202 can be configured to use an HTTP client and/or to use logging libraries such as those supplied by Java, JavaScript, and .NET libraries. An HTTP client enables the data source 202 to send data to the event collector 230 by supplying the data, and a Uniform Resource Identifier (URI) for the event collector 230 to the HTTP client. The HTTP client then handles establishing a connection with the event collector 230, transmitting a request containing the data, closing the connection, and receiving an acknowledgment if the event collector 230 sends one. Logging libraries enable HTTP 228 requests to the event collector 230 to be generated directly by the data source. For example, an application can include or link a logging library, and through functionality provided by the logging library manage establishing a connection with the event collector 230, transmitting a request, and receiving an acknowledgement.

An HTTP 228 request to the event collector 230 can contain a token, a channel identifier, event metadata, and/or event data. The token authenticates the request with the event collector 230. The channel identifier, if available in the indexing system 220, enables the event collector 230 to segregate and keep separate data from different data sources. The event metadata can include one or more key-value pairs that describe the data source 202 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 230 extracts events from HTTP 228 requests and sends the events to the indexer 232. The event collector 230 can further be configured to send events to one or more indexers. Extracting the events can include associating any metadata in a request with the event or events included in the request. In these implementations, event generation by the indexer 232 (discussed further below) is bypassed, and the indexer 232 moves the events directly to indexing. In some implementations, the event collector 230 extracts event data from a request and outputs the event data to the indexer 232, and the indexer generates events from the event data. In some implementations, the event collector 230 sends an acknowledgement message to the data source 202 to indicate that the event collector 230 has received a particular request form the data source 202, and/or to indicate to the data source 202 that events in the request have been indexed.

The indexer 232 ingests incoming data and transforms the data into searchable knowledge in the form of events. In the data intake and query system, an event is a single piece of
data that represents activity of the component represented in
FIG. 2 by the data source 202. An event can be, for example,
a single record in a log file that records a single action
performed by the component (e.g., a user login, a disk read,
transmission of a network packet, etc.). An event includes
one or more fields that together describe the action captured
by the event, where a field is a key-value pair (also referred
to as a name-value pair). In some cases, an event includes
both the key and the value, and in some cases the event
includes only the value and the key can be inferred or
assumed.

Transformation of data into events can include event
generation and event indexing. Event generation includes
identifying each discrete piece of data that represents one
event and associating each event with a timestamp and
possibly other information (which may be referred to herein
as metadata). Event indexing includes generating an index
(e.g., identifying keywords associated with the generated
events) based on the generated events. As an example, the
indexer 232 can include a parsing module 234 and an
indexing module 236 for generating and storing the events.
The parsing module 234 and indexing module 236 can be
modular and pipelined, such that one component can be
operating on a first set of data while the second component
is simultaneously operating on a second sent of data. Addi-
tionally, the indexer 232 may at any time have multiple
instances of the parsing module 234 and indexing module
236, with each set of instances configured to simultaneously
operate on data from the same data source or from different
data sources. The parsing module 234 and indexing module
236 are illustrated in FIG. 2 to facilitate discussion, with the
understanding that implementations with other components
are possible to achieve the same functionality.

The parsing module 234 determines information about
incoming event data, where the information can be used to
identify events within the event data. For example, the
parsing module 234 can associate a source type with the
event data. A source type identifies the data source 202 and
describes a possible data structure of event data produced by
the data source 202. For example, the source type can
indicate which fields to expect in events generated at the data
source 202 and the keys for the values in the fields, and
possibly other information such as sizes of fields, an order
of the fields, a field separator, and so on. The source type of
the data source 202 can be specified when the data source
202 is configured as a source of event data. Alternatively, the
parsing module 234 can determine the source type from the
event data, for example from an event field in the event data
or using machine learning techniques applied to the event
data.

Other information that the parsing module 234 can deter-
mine includes timestamps. In some cases, an event includes
a timestamp as a field, and the timestamp indicates a point
in time when the action represented by the event occurred or
was recorded by the data source 202 as event data. In these
cases, the parsing module 234 may be able to determine
from the source type associated with the event data that the
timestamps can be extracted from the events themselves. In
some cases, an event does not include a timestamp and the
parsing module 234 determines a timestamp for the event,
for example from a name associated with the event data from
the data source 202 (e.g., a file name when the event data is
in the form of a file) or a time associated with the event data
(e.g., a file modification time). As another example, when
the parsing module 234 is not able to determine a timestamp
from the event data, the parsing module 234 may use the
time at which it is indexing the event data. As another
example, the parsing module 234 can use a user-configured
rule to determine the timestamps to associate with events.

The parsing module 234 can further determine event
boundaries. In some cases, a single line (e.g., a sequence of
characters ending with a line termination) in event data
represents one event while in other cases, a single line
represents multiple events. In yet other cases, one event may
span multiple lines within the event data. The parsing
module 234 may be able to determine event boundaries from
the source type associated with the event data, for example
from a data structure indicated by the source type. In some
implementations, a user can configure rules the parsing
module 234 can use to identify event boundaries.

The parsing module 234 can further extract data from
events and possibly also perform transformations on the
events. For example, the parsing module 234 can extract a
set of fields (key-value pairs) for each event, such as a host
or hostname, source or source name, and/or source type. The
parsing module 234 may extract certain fields by default or
based on a user configuration. Alternatively or additionally,
the parsing module 234 may add fields to events, such as a
source type or a user-configured field. As another example of
a transformation, the parsing module 234 can anonymize
fields in events to mask sensitive information, such as social
security numbers or account numbers. Anonymizing fields
can include changing or replacing values of specific fields.
The parsing module 234 can further perform user-configured
transformations.

The parsing module 234 outputs the results of processing
incoming event data to the indexing module 236, which
performs event segmentation and builds index data struc-
tures.

Event segmentation identifies searchable segments, which
may alternatively be referred to as searchable terms or
keywords, which can be used by the search system of the
data intake and query system to search the event data. A
searchable segment may be a part of a field in an event or an
entire field. The indexer 232 can be configured to identify
searchable segments that are parts of fields, searchable
segments that are entire fields, or both. The parsing module
234 organizes the searchable segments into a lexicon or
dictionary for the event data, with the lexicon including each
searchable segment (e.g., the field "src=10.10.1.1") and a
reference to the location of each occurrence of the search-
able segment within the event data (e.g., the location within
the event data of each occurrence of "src=10.10.1.1"). As
discussed further below, the search system can use the
lexicon, which is stored in an index 246 (e.g., an index file),
to find event data that matches a search query. In some
implementations, segmentation can alternatively be per-
formed by the forwarder 226. Segmentation can also be
disabled, in which case the indexer 232 will not build a
lexicon for the event data. When segmentation is disabled,
the search system searches the event data directly.

The storage 238 may be a storage data structure on a
storage device (e.g., a disk drive or other physical device for
storing digital data). The storage device may be a component
of the computing device on which the indexer 232 is
operating (referred to herein as local storage) or may be a
component of a different computing device (referred to
herein as remote storage) that the indexer 232 has access to
over a network. The indexer 232 can manage more than one
index and can manage indexes of different types. For
example, the indexer 232 can manage event indexes, which
impose minimal structure on stored data and can accommo-
date any type of data. As another example, the indexer 232 can manage metrics indexes, which use a highly structured format to handle the higher volume and lower latency demands associated with metrics data.

The indexing module 236 organizes files in the storage 238 in directories referred to as buckets. The files in a bucket 244 can include raw data files, indexes, and possibly also other metadata files. As used herein, "raw data" means data as when the data was produced by the data source 202, without alteration to the format or content. As noted previously, the parsing module 234 may add fields to event data and/or perform transformations on fields in the event data. Event data that has been altered in this way is referred to herein as enriched data. A raw data file 248 can include enriched data, in addition to or instead of raw data. The raw data file 248 may be compressed to reduce disk usage. An index 246, which may also be referred to herein as a "time-series index" or tsidx file, contains metadata that the indexer 232 can use to search a corresponding raw data file 248. As noted above, the metadata in the index 246 includes a lexicon of the event data, which associates each unique keyword in the event data with a reference to the location of event data within the raw data file 248. The keyword data in the index 246 may also be referred to as an inverted index. In various implementations, the data intake and query system can use indexes for other purposes, such as to store data summarizations that can be used to accelerate searches.

A bucket 244 includes event data for a particular range of time. The indexing module 236 arranges buckets in the storage 238 according to the age of the buckets, such that buckets for more recent ranges of time are stored in short-term storage 240 and buckets for less recent ranges of time are stored in long-term storage 242. Short-term storage 240 may be faster to access while long-term storage 242 may be slower to access. Buckets may be moves from short-term storage 240 to long-term storage 242 according to a configurable data retention policy, which can indicate at what point in time a bucket is old enough to be moved.

A bucket's location in short-term storage 240 or long-term storage 242 can also be indicated by the bucket's status. As an example, a bucket's status can be "hot," "warm," "cold," "frozen," or "thawed." In this example, hot bucket is one to which the indexer 232 is writing data and the bucket becomes a warm bucket when the indexer 232 stops writing data to it. In this example, both hot and warm buckets reside in short-term storage 240. Continuing this example, when a warm bucket is moved to long-term storage 242, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 220 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 220 through the monitoring console 216 provided by the user interface system 214. Using the monitoring console 216, the user can configure and monitor an index cluster, and see information such as disk usage by an index, volume usage by an indexer, index and volume size over time, data age, statistics for bucket types, and bucket settings, among other information.

Figure 3:
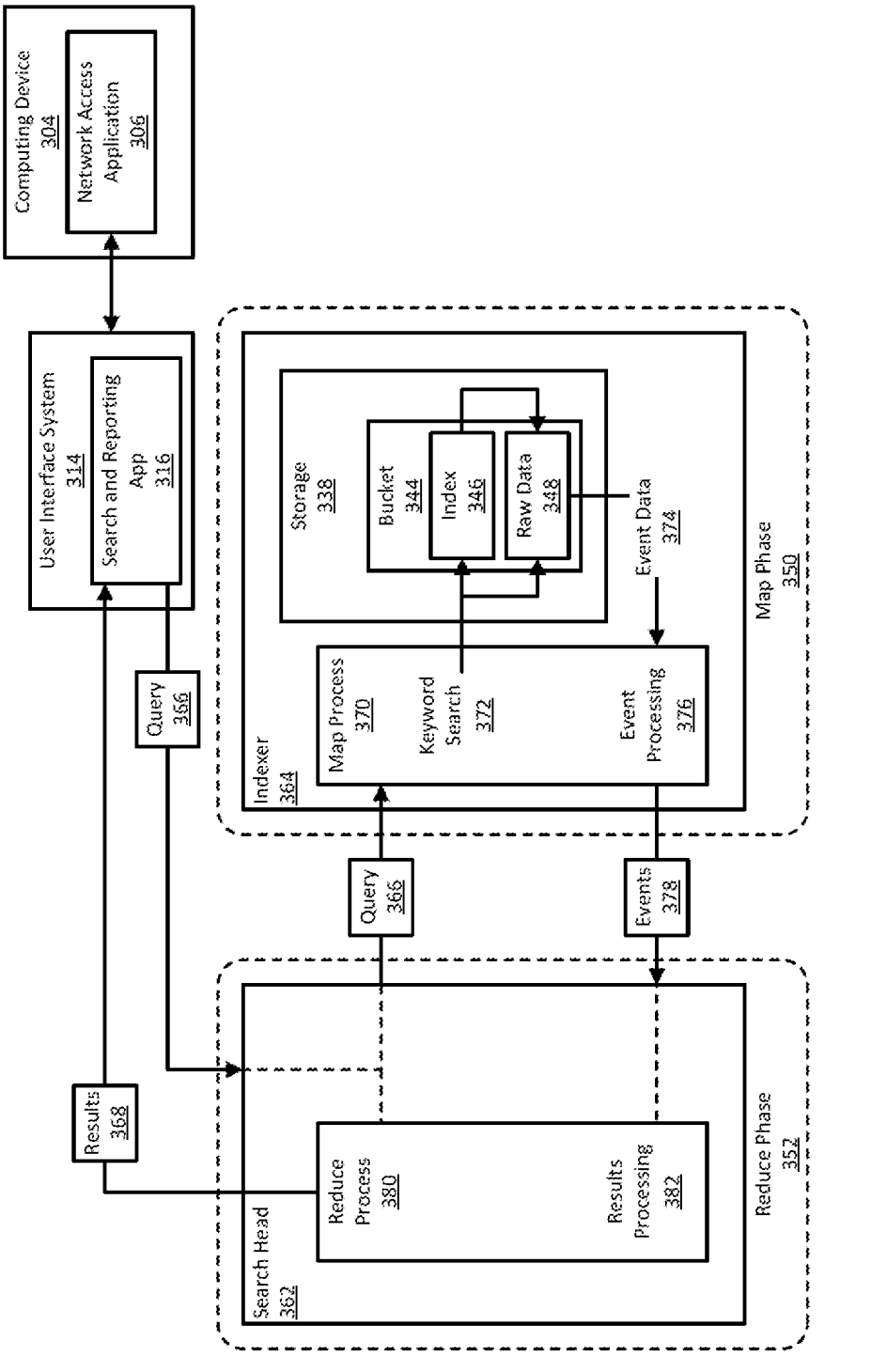
FIG. 3 is a block diagram of an example search system, in accordance with example embodiments.

FIG. 3 is a block diagram illustrating in greater detail an example of the search system 360 of a data intake and query system, such as the data intake and query system 110 of FIG. 1. The search system 360 of FIG. 3 issues a query 366 to a search head 362, which sends the query 366 to an indexer 364 (e.g., a search peer, a search node, etc.). Using a map process 370, the indexer 364 searches the appropriate storage 338 for events identified by the query 366 and sends events 378 so identified back to the search head 362. Using a reduce process 382, the search head 362 processes the events 378 and produces results 368 to respond to the query 366. The results 368 can provide useful insights about the data stored in the storage 338. These insights can aid in the administration of information technology systems, in security analysis of information technology systems, and/or in analysis of the development environment provided by information technology systems.

The query 366 that initiates a search is produced by a search and reporting app 316 that is available through the user interface system 314 of the data intake and query system. Using a network access application 306 executing on a computing device 304, a user can input the query 366 into a search field provided by the search and reporting app 316. Alternatively or additionally, the search and reporting app 316 can include pre-configured queries or stored queries that can be activated by the user. In some cases, the search and reporting app 316 initiates the query 366 when the user enters the query 366. In these cases, the query 366 maybe referred to as an "ad-hoc" query. In some cases, the search and reporting app 316 initiates the query 366 based on a schedule. For example, the search and reporting app 316 can be configured to execute the query 366 once per hour, once per day, at a specific time, on a specific date, or at some other time that can be specified by a date, time, and/or frequency. These types of queries maybe referred to as scheduled queries.

The query 366 is specified using a search processing language. The search processing language includes commands or search terms that the indexer 364 will use to identify events to return in the search results 368. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 366 to include sequential commands, where a subsequent command may operate on the results of a prior command. As an example, sequential commands may be separated in the query 366 by a vertical line ("|" or "pipe") symbol.

In addition to one or more search commands, the query 366 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 366 occurs in two broad phases: a map phase 350 and a reduce phase 352. The map phase 350 takes place across one or more indexers. In the map phase 350, the indexers locate event data that matches the search terms in the search query 366 and sorts the event data into field-value pairs. When the map phase 350 is complete, the indexers send events that they have found to one or more search heads for the reduce phase 352. During the reduce phase 352, the search heads process the events through commands in the search query 366 and aggregate the events to produce the final search results 368.

A search head, such as the search head 362 illustrated in FIG. 3, is a component of the search system 360 that manages searches. The search head 362, which may also be referred to herein as a search management component, can be implemented using program code that can be executed on a computing device. The program code for the search head 362 can be stored on a non-transitory computer-readable medium and from this medium can be loaded or copied to the memory of a computing device. One or more hardware processors of the computing device can read the program code from the memory and execute the program code in order to implement the operations of the search head 362.

Upon receiving the search query 366, the search head 362 directs the query 366 to one or more indexers, such as the indexer 364 illustrated in FIG. 3. "Search peer" is an alternate name for "indexer" and a search peer may be largely similar to the indexer described previously. The indexer 364 may be referred to as a "peer node" when the indexer 364 is part of an indexer cluster. The indexer 364, which may also be referred to as a search execution component, can be implemented using program code that can be executed on a computing device. In some implementations, one set of program code implements both the search head 362 and the indexer 364 such that the search head 362 and the indexer 364 form one component. In some implementations, the search head 362 is an independent piece of code that performs searching and no indexing functionality. In these implementations, the search head 362 may be referred to as a dedicated search head.

The search head 362 may consider multiple criteria when determining whether to send the query 366 to the particular indexer 364. For example, the search system 360 may be configured to include multiple indexers that each have duplicative copies of at least some of the event data and are implanted using different hardware resources. In this example, the sending the search query 366 to more than one indexer allows the search system 360 to distribute the search workload across different hardware resources. As another example, search system 360 may include different indexers for different purposes (e.g., one has an index storing a first type of data or from a first data source while a second has an index storing a second type of data or from a second data source). In this example, the search query 366 may specify which indexes to search, and the search head 362 will send the query 366 to the indexers that have those indexes.

To identify events 378 to send back to the search head 362, the indexer 364 performs a map process 370 to obtain event data 374 from the storage 338 that is maintained by the indexer 364. During a first phase of the map process 370, the indexer 364 identifies buckets that have events that are described by the time indicator in the search query 366. As noted above, a bucket contains events whose timestamps fall within a particular range of time. For each bucket 344 whose events can be described by the time indicator, during a second phase of the map process 370, the indexer 364 performs a keyword search 372 using search terms specified in the search query 366. The search terms can be one or more of keywords, phrases, fields, Boolean expressions, and/or comparison expressions that in combination describe events being searched for. When segmentation is enabled at index time, the indexer 364 performs the keyword search 372 on the bucket's index 346. As noted previously, the index 346 includes a lexicon of the searchable terms in the events stored in the bucket's raw data 348 file. The keyword search 372 searches the lexicon for searchable terms that correspond to one or more of the search terms in the query 366. As also noted above, the lexicon incudes, for each searchable term, a reference to each location in the raw data 348 file where the searchable term can be found. Thus, when the keyword search identifies a searchable term in the index 346 that matches a search term in the query 366, the indexer 364 can use the location references to extract from the raw data 348 file the event data 374 for each event that include the searchable term.

In cases where segmentation was disabled at index time, the indexer 364 performs the keyword search 372 directly on the raw data 348 file. To search the raw data 348, the indexer 364 may identify searchable segments in events in a similar manner as when the data was indexed. Thus, depending on how the indexer 364 is configured, the indexer 364 may look at event fields and/or parts of event fields to determine whether an event matches the query 366. Any matching events can be added to the event data 374 read from the raw data 348 file. The indexer 364 can further be configured to enable segmentation at search time, so that searching of the storage 338 causes the indexer 364 to build a lexicon in the index 346.

The event data 374 obtained from the raw data 348 file includes the full text of each event found by the keyword search 372. During a third phase of the map process 370, the indexer 364 performs event processing 376 on the event data 374, with the steps performed being determined by the configuration of the indexer 364 and/or commands in the search query 366. For example, the indexer 364 can be configured to perform field discovery and field extraction. Field discovery is a process by which the indexer 364 identifies and extracts key-value pairs from the events in the event data 374. The indexer 364 can, for example, be configured to automatically extract the first 100 fields (or another number of fields) in the event data 374 that can be identified as key-value pairs. As another example, the indexer 364 can extract any fields explicitly mentioned in the search query 366. The indexer 364 can, alternatively or additionally, be configured with particular field extractions to perform.

Other examples of steps that can be performed during event processing 376 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The indexer 364 sends processed events 378 to the search head 362, which performs a reduce process 380. The reduce process 380 potentially receives events from multiple indexers and performs various results processing 382 steps on the received events. The results processing 382 steps can include, for example, aggregating the events received from different indexers into a single set of events, deduplicating and aggregating fields discovered by different indexers, counting the number of events found, and sorting the events by timestamp (e.g., newest first or oldest first), among other examples. Results processing 382 can further include applying commands from the search query 366 to the events. The query 366 can include, for example, commands for evaluating and/or manipulating fields (e.g., to generate new fields from existing fields or parse fields that have more than one value). As another example, the query 366 can include commands for calculating statistics over the events, such as counts of the occurrences of fields, or sums, averages, ranges, and so on, of field values. As another example, the query 366 can include commands for generating statistical values for purposes of generating charts of graphs of the events.

The reduce process 380 outputs the events found by the search query 366, as well as information about the events. The search head 362 transmits the events and the information about the events as search results 368, which are received by the search and reporting app 316. The search and reporting app 316 can generate visual interfaces for viewing the search results 368. The search and reporting app 316 can, for example, output visual interfaces for the network access application 306 running on a computing device 304 to generate.

The visual interfaces can include various visualizations of the search results 368, such as tables, line or area charts, Chloropleth maps, or single values. The search and reporting app 316 can organize the visualizations into a dashboard, where the dashboard includes a panel for each visualization. A dashboard can thus include, for example, a panel listing the raw event data for the events in the search results 368, a panel listing fields extracted at index time and/or found through field discovery along with statistics for those fields, and/or a timeline chart indicating how many events occurred at specific points in time (as indicated by the timestamps associated with each event). In various implementations, the search and reporting app 316 can provide one or more default dashboards. Alternatively or additionally, the search and reporting app 316 can include functionality that enables a user to configure custom dashboards.

The search and reporting app 316 can also enable further investigation into the events in the search results 368. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 366. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 4:
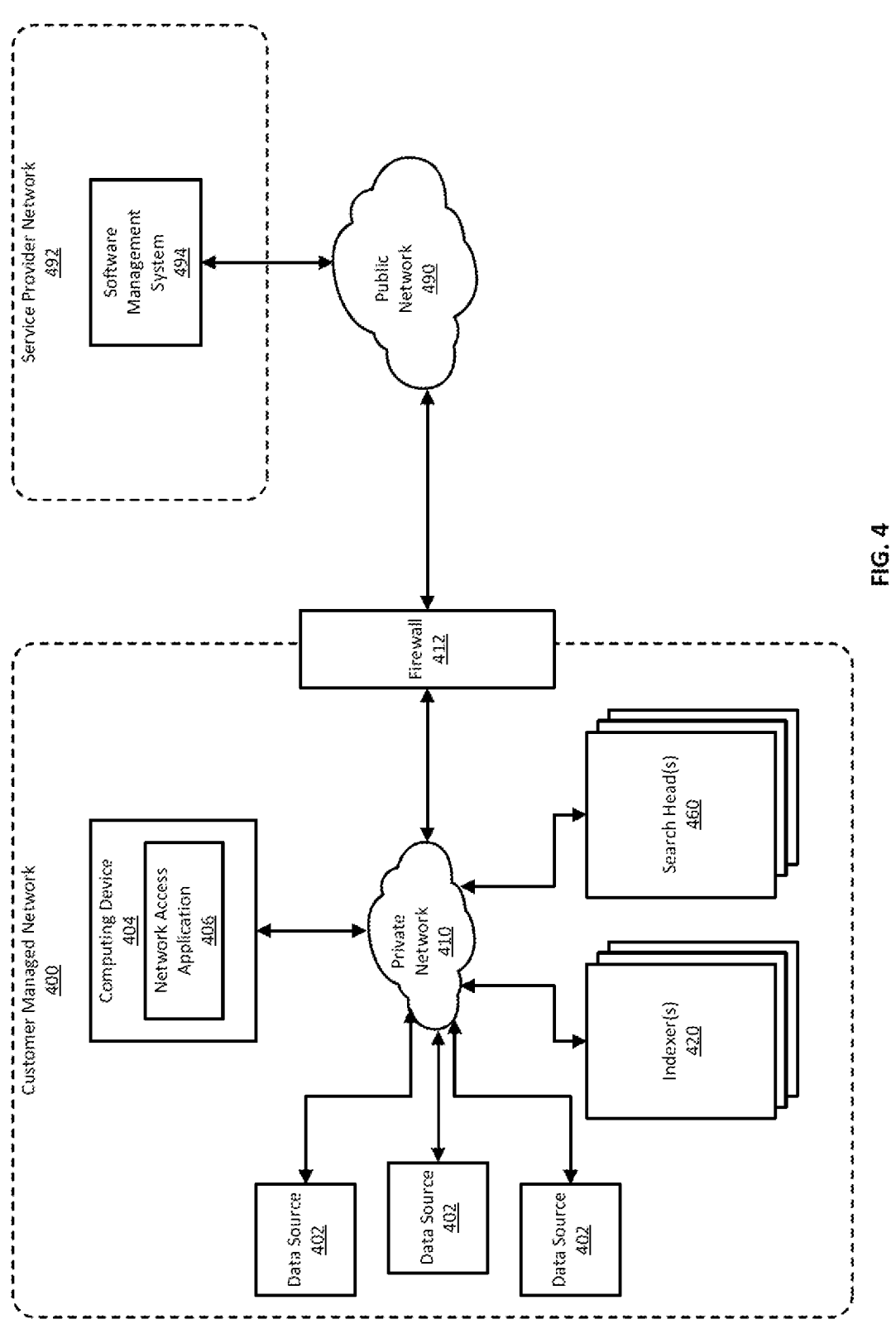
FIG. 4 is a block diagram of an example self-managed network, in accordance with example embodiments.

FIG. 4 illustrates an example of a self-managed network 400 that includes a data intake and query system. "Self-managed" in this instance means that the entity that is operating the self-managed network 400 configures, administers, maintains, and/or operates the data intake and query system using its own compute resources and people. Further, the self-managed network 400 of this example is part of the entity's on-premise network and includes a set of compute, memory, and networking resources that are located, for example, within the confines of an entity's data center. These resources can include software and hardware resources. The entity can, for example, be a company or enterprise, a school, government entity, or other entity. Since the self-managed network 400 is located within the customer's on-prem environment, such as in the entity's data center, the operation and management of the self-managed network 400, including of the resources in the self-managed network 400, is under the control of the entity. For example, administrative personnel of the entity have complete access to and control over the configuration, management, and security of the self-managed network 400 and its resources.

The self-managed network 400 can execute one or more instances of the data intake and query system. An instance of the data intake and query system may be executed by one or more computing devices that are part of the self-managed network 400. A data intake and query system instance can include an indexing system and a search system, where the indexing system includes one or more indexers 420 and the search system includes one or more search heads 460.

As depicted in FIG. 4, the self-managed network 400 can include one or more data sources 402. Data received from these data sources may be processed by an instance of the data intake and query system within self-managed network 400. The data sources 402 and the data intake and query system instance can be communicatively coupled to each other via a private network 410.

Users associated with the entity can interact with and avail themselves of the functions performed by a data intake and query system instance using computing devices. As depicted in FIG. 4, a computing device 404 can execute a network access application 406 (e.g., a web browser), that can communicate with the data intake and query system instance and with data sources 402 via the private network 410. Using the computing device 404, a user can perform various operations with respect to the data intake and query system, such as management and administration of the data intake and query system, generation of knowledge objects, and other functions. Results generated from processing performed by the data intake and query system instance may be communicated to the computing device 404 and output to the user via an output system (e.g., a screen) of the computing device 404.

The self-managed network 400 can also be connected to other networks that are outside the entity's on-premise environment/network, such as networks outside the entity's data center. Connectivity to these other external networks is controlled and regulated through one or more layers of security provided by the self-managed network 400. One or more of these security layers can be implemented using firewalls 412. The firewalls 412 form a layer of security around the self-managed network 400 and regulate the transmission of traffic from the self-managed network 400 to the other networks and from these other networks to the self-managed network 400.

Networks external to the self-managed network can include various types of networks including public networks 490, other private networks, and/or cloud networks provided by one or more cloud service providers. An example of a public network 490 is the Internet. In the example depicted in FIG. 4, the self-managed network 400 is connected to a service provider network 492 provided by a cloud service provider via the public network 490.

In some implementations, resources provided by a cloud service provider may be used to facilitate the configuration and management of resources within the self-managed network 400. For example, configuration and management of a data intake and query system instance in the self-managed network 400 may be facilitated by a software management system 494 operating in the service provider network 492. There are various ways in which the software management system 494 can facilitate the configuration and management of a data intake and query system instance within the self-managed network 400. As one example, the software management system 494 may facilitate the download of software including software updates for the data intake and query system. In this example, the software management system 494 may store information indicative of the versions of the various data intake and query system instances present in the self-managed network 400. When a software patch or upgrade is available for an instance, the software manage-ment system 494 may inform the self-managed network 400 of the patch or upgrade. This can be done via messages communicated from the software management system 494 to the self-managed network 400.

The software management system 494 may also provide simplified ways for the patches and/or upgrades to be downloaded and applied to the self-managed network 400. For example, a message communicated from the software management system 494 to the self-managed network 400 regarding a software upgrade may include a Uniform Resource Identifier (URI) that can be used by a system administrator of the self-managed network 400 to download the upgrade to the self-managed network 400. In this man-ner, management resources provided by a cloud service provider using the service provider network 492 and which are located outside the self-managed network 400 can be used to facilitate the configuration and management of one or more resources within the entity's on-prem environment. In some implementations, the download of the upgrades and patches may be automated, whereby the software manage-ment system 494 is authorized to, upon determining that a patch is applicable to a data intake and query system instance inside the self-managed network 400, automatically communicate the upgrade or patch to self-managed network 400 and cause it to be installed within self-managed network 400.

2.0. Externally Distributed Buckets Overview

As previously mentioned, the data intake and query system can ingest data, process the data (e.g., perform various transformations or manipulations of the data), and output the data. For example, the data intake and query system can ingest log data (e.g., the log data including raw machine data), process the data, and output the data for storage and use in executing queries. The data intake and query system may use one or more indexers to process the data (e.g., index the data, store the data, search the data, etc.).

The indexers may be or may be implemented by process-ing nodes (e.g., indexing nodes, search peers, search nodes, peer nodes, etc.). For example, where indexers search data, they (or the component that does search data) may be referred to as "search peers" or "search nodes." Accordingly, reference to an indexer can refer to a processing node or other component or computing device configured to perform one or more search-related tasks.

The data intake and query system can ingest data from a data source and identify indexers to process the data. The data intake and query system can assign the indexers to process all or a portion of the data. For example, the data intake and query system may identify one or more indexers and assign the one or more indexers to obtain at least a portion of the data from a data source 202 (e.g., which may reside in a shared storage system), index and store the at least a portion of the data (e.g., in one or more buckets of a data store locally and/or in a shared storage system), and/or execute at least a portion of a query (e.g., search) on the at least a portion of the data.

Based on the assignment by the data intake and query system, the indexers may process all or a portion of the data. For example, a first indexer may process at least a portion of the data to generate an index and store the index and the at least a portion of the data in a bucket of a data store (e.g., in a shared storage system) and a second indexer may execute at least a portion of a query using the index and at least a portion of the data stored in the bucket.

To generate an index, as discussed above, the indexers may obtain at least a portion of the data, process the data to generate content for the index. As part of processing the data from the data source, the indexer may adjust the format of the data, adjust or remove the metadata of the data, adjust or remove metrics associated with the data, adjust or remove columns associated with the data, etc.

As the indexers may execute the query (or at least a portion of the query) using the index and at least a portion of the data in the bucket of the data store, a system may be limited in execution of queries. For example, the system may be unable to execute queries using metadata, metrics, columns, data enrichments, etc. that were removed or adjusted by the system during processing of the data (e.g., during indexing). Therefore, the system may be limited to execution of queries on data as processed by the system.

Such a system may prove unsatisfactory where the data generated by, provided by, obtained from, etc. the data source is structured or semi-structured data and the data stored by a system is unstructured data. For example, as part of indexing incoming structured or semi-structured data, the system may remove those parts of the data that make it structured and/or semi-structured (e.g., the formatting, meta-data, metrics, columns, data enrichments, etc.) This can lead to a loss of data which may be undesirable as it can lead to longer search times, partial or incomplete query execution, erroneous query results, and/or the inability to execute certain queries.

Further, such a system may prove unsatisfactory where the data from (e.g., generated by, provided by, obtained from, etc.) the data source corresponds to a first format (e.g., Parquet data format or other structured or semi-structured data format) and the data stored by a system corresponds to a second format (e.g., an S2S format or other unstructured data format). For example, to generate data in the second format from the data in the first format, the system may adjust the data in the first format and/or the format of the data in the first format. This can lead to a loss of data (e.g., metadata, metrics, columns, data enrichments, etc.) which may be undesirable as it can lead to partial or incomplete query execution and/or erroneous query results, and/or slower query times (e.g., more time used to execute a query).

Thus, by executing queries on the data as stored by the system as compared to executing queries on the data from the data source, the system may experience a longer search time, obtain different query results (e.g., erroneous query results) and/or partial or incomplete query results. This may be inefficient and may cause an inadequate performance of the system.

To address these issues, embodiments of the present disclosure relate to a data intake and query system config-ured to generate an index based on (e.g., using) data (structured and/or semi-structured) from a data source (e.g., a data lake) and store the index and a location identifier of a location of the data at the data source in one or more buckets of a data store. Moreover, in some cases, the data intake and query system may delete or not save the data from the data source itself. In this way, the data intake and query system can reduce the amount of data that it stores, while retaining access to the data from the data source.

In some cases, during a search query that involves the aforementioned data from the data source, the data intake and query system may use the index (generated using the data from the data source) to execute some or all of the query and/or may use the location identifier to obtain (e.g., for a second time, reobtain, etc.) the data (or relevant portion thereof) from the data source and execute queries on data that is structured and/or semi-structured. In this way, the data intake and query system may reduce the amount of memory that it uses to store data while retaining the ability to search the data in its original format in a performant way.

As described herein, the data intake and query system may obtain, process, and execute one or more searches corresponding to a query using one or more indexers. For example, the data intake and query system may assign a first set of indexers to obtain the set of data, process the data, and generate an index and a second set of indexers (the same or different from the first set of indexers) to execute one or more searches corresponding to a query using the index and a location identifier of the data source.

As discussed above, the data intake and query system can assign a first set of indexers to obtain a set of data (e.g., one or more Parquet files) from the data source (also referred to herein as the set of ingest data). The data source may correspond to (e.g., may be located at) an external location. For example, the data source may be located at a location that is external to, remote from, distinct and separate relative to, etc. the data intake and query system. In some cases, the data source and the data intake and query system may be located at different physical or geographic locations. In some cases, the data source and the data intake and query system may be located at different locations within a cloud computing environment.

Based on assignment of the first set of indexers to obtain the set of ingest data from the data source, the first set of indexers can obtain the set of ingest data from the data source. As discussed above, the data intake and query system can assign the first set of indexers (or a different set of indexers) to process the set of ingest data and generate one or more indexes. For example, the data intake and query system can assign the first set of indexers to, and the first set of indexers may, process a plurality of files (e.g., Parquet files) and generate an index that corresponds to each of the plurality of files. In some cases, the data intake and query system can assign the first set of indexers to, and the first set of indexers may, process a plurality of files (e.g., Parquet files) and generate a respective index for all or a portion of the plurality of files.

The first set of indexers (or a different set of indexers) may process (e.g., parse, filter, etc.) the set of ingest data to identify a location (e.g., an external location) associated with the set of ingest data (e.g., a location from which the set of ingest data was obtained from the data source, a location within a data store associated with the data source, etc.). For example, the first set of indexers may process the set of ingest data to identify a location of a data lake (external to the data intake and query system) storing the set of ingest data.

The first set of indexers may obtain (e.g., generate) a location identifier (e.g., a pointer, a link, a reference, an address, etc.) indicative of the location associated with the set of ingest data based on identifying the location of the set of ingest data. For example, the location identifier may be a pointer pointing to the location of the set of ingest data as stored by the data source. In some cases, the first set of indexers may obtain the location identifier from the data source.

The first set of indexers (or a different set of indexers) may store the generated index and the location identifier in one or more buckets of a data store. In some cases, the first set of indexers may store additional data (e.g., search related files) in one or more buckets of a data store.

In some cases, the first set of indexers may not store the set of ingest data (obtained from the data source) in the one or more buckets of the data store and/or may not maintain the set of ingest data in local storage (or in a shared storage system) of the data intake and query system. Further, the data intake and query system (e.g., via the one or more indexers) may discard the set of ingest data (e.g., from local storage of the data intake and query system). For example, the data intake and query system may discard the set of ingest data based on or subsequent to generation of the index and/or obtaining the location identifier.

As the first set of indexers may not store the set of ingest data in the one or more buckets of the data store, the size of the one or more buckets can be reduced and the efficiency of the data intake and query system can be increased relative to systems that store the set of ingest data in the one or more buckets (e.g., with the index). As a non-limiting example, the size of the one or more buckets can be reduced from 250 megabytes to 100 megabytes by not storing the set of ingest data locally at the data intake and query system (e.g., in the one or more buckets). Additionally, by not storing the set of ingest data locally (and reducing the size of the one or more buckets), the data intake and query system can more efficiently execute queries as compared to systems that store the set of ingest data in the one or more buckets. Moreover, the data source may retain the set of ingest data in its original (structured and/or semi-structured) format in a way that enables the set of ingest data to be searched in a performant way and/or in a way that enables the data intake and query system to execute queries that it otherwise would be unable to execute and/or execute queries in a more performant way.

As discussed above, the data intake and query system can assign a second set of indexers to execute at least a portion of an obtained query. To execute at least a portion of an obtained query, the second set of indexers can parse an index (e.g., as stored in the one or more buckets of the data store) associated with the (structured and/or semi-structured) data obtained from the data source. Using the index, the second set of indexers can identify a set of data that satisfies at least a portion of the query (also referred to herein as a set of query data) (e.g., a term in the index that corresponds to a term in an event of the data matches a search term in the query 366).

In addition, using the index, the second set of indexers can identify the location identifier for the set of query data that is also part of the set of ingest data. Further, the second set of indexers (or a different set of indexers) may obtain at least a portion of the set of query data from the location indicated by the location identifier.

The second set of indexers can obtain the at least a portion of the set of query data from the location associated with the set of ingest data and store the at least a portion of the set of query data (which is also a portion of the set of ingest data)

in a data store (e.g., a local data store of the second set of indexers). The second set of indexers (or a different set of indexers) can execute one or more searches (based on the query) on the at least a portion of the set of query data to obtain event data responsive to the query.

As traditional systems may cause indexers to download at least a portion of the set of query data from shared storage of the traditional systems to local storage for execution of queries, the second set of indexers obtaining at least a portion of the set of query data from an external location may not impact (e.g., increase) a time period for execution of the search process.

As such, the described data intake and query system enables the efficient execution of queries as compared to traditional approaches. For example, the data intake and query system can execute queries on a set of query data stored at an external location using a location identifier of the external location and an index based on a corresponding set of ingest data.

2.1. Indexing Process Using a Location Identifier

As discussed above, the data intake and query system can ingest and process data. For example, the data intake and query system can ingest the data and generate an index based on (e.g., using) the data. In some cases, the data intake and query system can ingest and process the data for execution of queries. In some such cases, the data intake and query system may use the index during search time to (more efficiently) search the data.

The techniques described below can enable a data intake and query system to generate an index based on a set of data without retaining the set of data (e.g., without storing a copy of the set of data in the data intake and query system or in an environment under the control of the data intake and query system). To enable such a generation of an index, the data intake and query system can obtain a set of data from a data source (e.g., at an external location relative to the data intake and query system) (also referred to herein as a set of ingest data). The data intake and query system can assign one or more indexers to process the set of ingest data and generate an index. The data intake and query system can store the index and a location identifier of a location of the data source (or a location of the set of ingest data within the data source) in one or more buckets of a data store for execution of queries. In some cases, the data intake and query system may discard the set of ingest data (e.g., as obtained from the data source). For example, the data intake and query system may discard a local copy of the set of ingest data. In some cases, by not storing a local copy of the set of data in the one or more buckets of the data store, the data intake and query systems may reduce the data corresponding to the set of ingest data by 40-60%, reduce the size of the buckets by 40% to 60%, and/or reduce the quantity of buckets used to store the set of ingest data. Further, the described systems solve challenges of existing data intake and query systems by generating an index for data that is not retained at the data intake and query system as existing data intake and query systems may utilize an index provided by an external system to process data provided by the external system or an index generated by the data intake and query system to process data processed by the data intake and query system.

While existing systems may be able to generate indexes for sets of data, such existing systems may be inefficient where the sets of ingest data are associated with a particular format or structure (e.g., having particular metadata, metrics, columns, data enrichments, etc.) that is removed or adjusted as the sets of ingest data are processed by the existing systems. For example, existing systems may remove or adjust one or more columns of a set of ingest data as the set of ingest data is processed by the existing systems (e.g., as part of ingestion). As the sets of ingest data with different formats, metadata, metrics, columns, data enrichments, etc. increases, it may be helpful that the system is able to index the sets of ingest data and maintain a mechanism by which the system can search the sets of ingest data with different formats, metadata, metrics, columns, data enrichments, etc.

Figure 5:
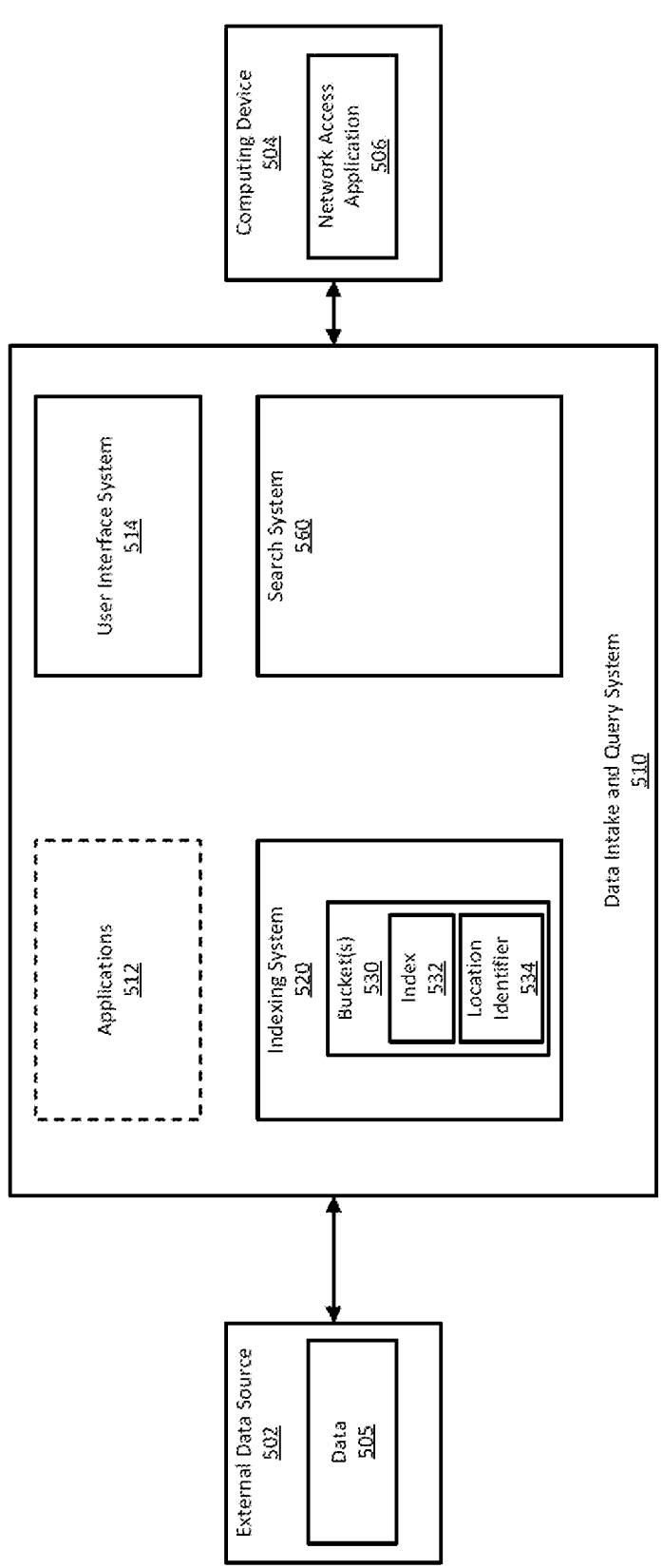
FIG. 5 is a block diagram of an example data intake and query system, in accordance with example embodiments.

FIG. 5 is a block diagram of an example of an environment 500 for processing and searching data. In the illustrated example, the computing environment 500 includes a data intake and query system 510 similar to data intake and query system 110 described herein at least with reference to FIG. 1, an external data source 502 (similar to the data source 102), and a computing device 504 (similar to the computing device 104).

As described herein at least with reference to FIG. 1, the data intake and query system 510 may include an indexing system 520, a search system 560, applications 512, and a user interface system 514. In some cases, the data intake and query system 510 can include one or more ingestors, a message bus, one or more forwarders, one or more search heads, one or more indexers, a node coordinator, and/or a shared storage system (not shown in FIG. 5). It will be understood that the components illustrated in FIG. 5 are for illustrative purposes only and that the data intake and query system 510 can include fewer or more components.

As discussed above, the data intake and query system 510 can obtain data from an external data source 502 in the computing environment 500, and ingest the data using an indexing system 120. The external data source 502 may be a distributed, shared, and/or cloud based data storage system (e.g., Amazon S3). The external data source 502 may be external to the data intake and query system 510. The external data source 502 and the data intake and query system 510 may be located at separate and distinct locations (e.g., different locations). For example, the external data source 502 and the data intake and query system 510 may be implemented using computing devices located at different physical or geographic locations. In another example, the external data source 502 and the data intake and query system 510 may be located at different locations within a cloud computing environment.

In some cases, the data intake and query system 510 and the external data source 502 may be managed by different data managers. Further, the data intake and query system 510 and the external data source 502 may have different permissions (e.g., data permissions), validations, authorizations, etc. for users to access all or a portion of the respective system.

The external data source 502 may generate the data 505 (also referred to herein as ingest data 505). The ingest data 505 may include structured and/or semi-structured data in a particular format or structure (e.g., having particular columns, metadata, metrics, data enrichments, etc.). In some cases, the external data source 502 may obtain the ingest data 505 in the particular format and/or process the ingest data 505 such that the ingest data 505 has the particular format.

The data intake and query system 510 can obtain the ingest data 505 from the external data source 502. As discussed above, the data intake and query system 510 can obtain the ingest data 505 from the external data source 502 and process the ingest data 505 using the indexing system 520. To process the ingest data 505, the indexing system 520 can parse the ingest data 505 to identify individual events within the ingest data 505. Further, the indexing system 520 can generate an index 532 for the ingest data 505.

The indexing system 520 may generate the index 532 for the ingest data 505 without prior knowledge of the structure or format of the ingest data 505. For example, the indexing system 520 may generate the index 532 based on the structure and/or format of the ingest data 505 as provided by the external data source 502.

The indexing system 520 (or a separate system of the data intake and query system 510) may obtain and/or identify a location identifier 534 associated with the ingest data 505 and/or the external data source 502. For example, the indexing system 520 may obtain the location identifier 534 from the external data source 502. In some cases, the indexing system 520 may parse the ingest data 505 to identify the location identifier 534. For example, the ingest data 505 may include the location identifier 534.

In some cases, the indexing system 520 may generate the location identifier 534 based on the ingest data 505 and/or the external data source 502. For example, the indexing system 520 may generate the location identifier 534 based on communications from the external data source 502 such that the location identifier 534 is indicative of the external data source 502. In certain cases, the indexing system 520 generates the location identifier 534 as it receives and/or processes the ingest data 505. For example, the ingest data 505 may indicate the location from which it came.

The location identifier 534 may be indicative of the external data source 502, a particular data repository associated with the external data source 502 (e.g., a particular data store, a particular data lake, etc.), a particular location within a particular data repository associated with the external data source 502 (e.g., a particular location within a data lake), etc. In some cases, the location identifier 534 may enable a component (e.g., the search system 560) to identify a location of the ingest data 505 as stored by the external data source 502.

The indexing system 520 can store the index 532 and the location identifier 534 in one or more buckets 530 of a data store. In some cases, the index 532 may be associated with multiple location identifiers 534. For example, the index 532 may correspond to multiple sets of ingest data (e.g., obtained from the same or multiple external data sources). Moreover, although illustrated as being separate from the index 532, it will be understood that the location identifier(s) 534 may be stored in or as part of the index 532.

Based on generation of the index 532 and/or obtaining the location identifier 534, the data intake and query system 510 may discard the ingest data 505 (and/or the ingest data 505 as processed by the data intake and query system 510) from local storage of the data intake and query system 510.

As discussed above, the search system 560 can execute one or more queries. For example, the data intake and query system 510 can obtain one or more queries (e.g., from the computing device 504). The data intake and query system 510 can provide the one or more queries to the search system 560 for execution.

To execute the one or more queries, the search system 560 can assign at least a portion of the one or more queries to one or more indexers. Based on the assignment, the one or more indexers can utilize the index 532 to identify events responsive to the at least a portion of the one or more queries. For example, the one or more indexers can execute one or more searches on the index 532 to identify events responsive to the at least a portion of the one or more queries.

For events from the ingest data 505 identified as being responsive to the at least a portion of the one or more queries using the index 532, the search system 560 can utilize the location identifier 534 to identify a location of the events (within the ingest data 505). The search system 560 can obtain the events from the identified location (located externally to the data intake and query system 510). In some cases, the search system 560 can route a request to the external data source 502 to obtain the events from the identified location and provide the events to the data intake and query system 510.

As discussed above, the user interface system 514 may provide mechanisms through which users associated with the computing environment 500 (and possibly others) can interact with the data intake and query system 510. As discussed above, the data intake and query system 510 can optionally include applications 512. The applications 512 may be or may include a collection of configurations, knowledge objects, views, and dashboards that may provide additional functionality, different techniques for searching the data, and/or additional insights into the data. In some cases, data intake and query system 510 may obtain input via the applications 512 (e.g., a query, a request, etc.). For example, the input may include a request for analytics, a visualization, execution of a query, etc.

The computing device 504 can provide a human-machine interface through which a person can have a digital presence in the computing environment 500 in the form of a user. The computing device 504 may be an electronic device having one or more processors and a memory capable of storing instructions for execution by the one or more processors. The computing device 104 can further include input/output (I/O) hardware and a network interface. Applications executed by the computing device 104 can include a network access application 506, such as a web browser, which can use a network interface of the client computing device 504 to communicate, over a network, with the user interface system 514 of the data intake and query system 510.

Though FIG. 5 illustrates only one data source, it will be understood that the computing environment 500 may include many data sources spread across numerous computing devices. The computing devices may be controlled and operated by a single entity or multiple entities. For example, in an "on the premises" or "on-prem" implementation, the computing devices may physically and digitally be controlled by one entity, meaning that the computing devices are in physical locations that are owned and/or operated by the entity and are within a network domain that is controlled by the entity.

In some implementations, the computing environment 500 can include on-prem and cloud-based computing resources, or only cloud-based resources.

2.2. Indexing and Searching Processes Using a Location Identifier

As discussed above, the data intake and query system can ingest and process data using one or more indexers. For example, the data intake and query system can ingest the data and generate an index based on (e.g., for) the data using a first indexer and can search the data using a second indexer, which may be the same or different from the first indexer.

The techniques described below can enable a first indexer to generate an index based on a set of ingest data from an external data source without retaining the set of ingest data. The first indexer can process the set of ingest data and generate an index. The first indexer can store the index and a location identifier of a location of the external data source (or a location within the external data source) in one or more buckets of a data store for execution of queries. In some cases, the data intake and query system may discard the set of ingest data (e.g., as obtained from the external data source). A second indexer may use the index and the location identifier to execute one or more searches based on a query on the set of ingest data as stored by the external data source. These techniques solve challenges of existing data intake and query systems in that these systems may enable data stored by an external data source to be searched in the same or a similar manner as data processed and stored by the data intake and query system. Moreover, these techniques can reduce the amount of data stored by the data intake and query system 510.

While existing systems are able to search different sets of data, such existing systems may be unable to search the different sets of data using indexes generated by the systems. Instead, the existing systems may utilize indexes generated by the external data sources to search data stored by the external data sources and/or may utilize indexes generated by the existing systems to search data processed and stored by the existing systems. As the different sets of data increases, it may be beneficial for the system to be able to index and search different sets of data in the same or a similar manner.

Figure 6:
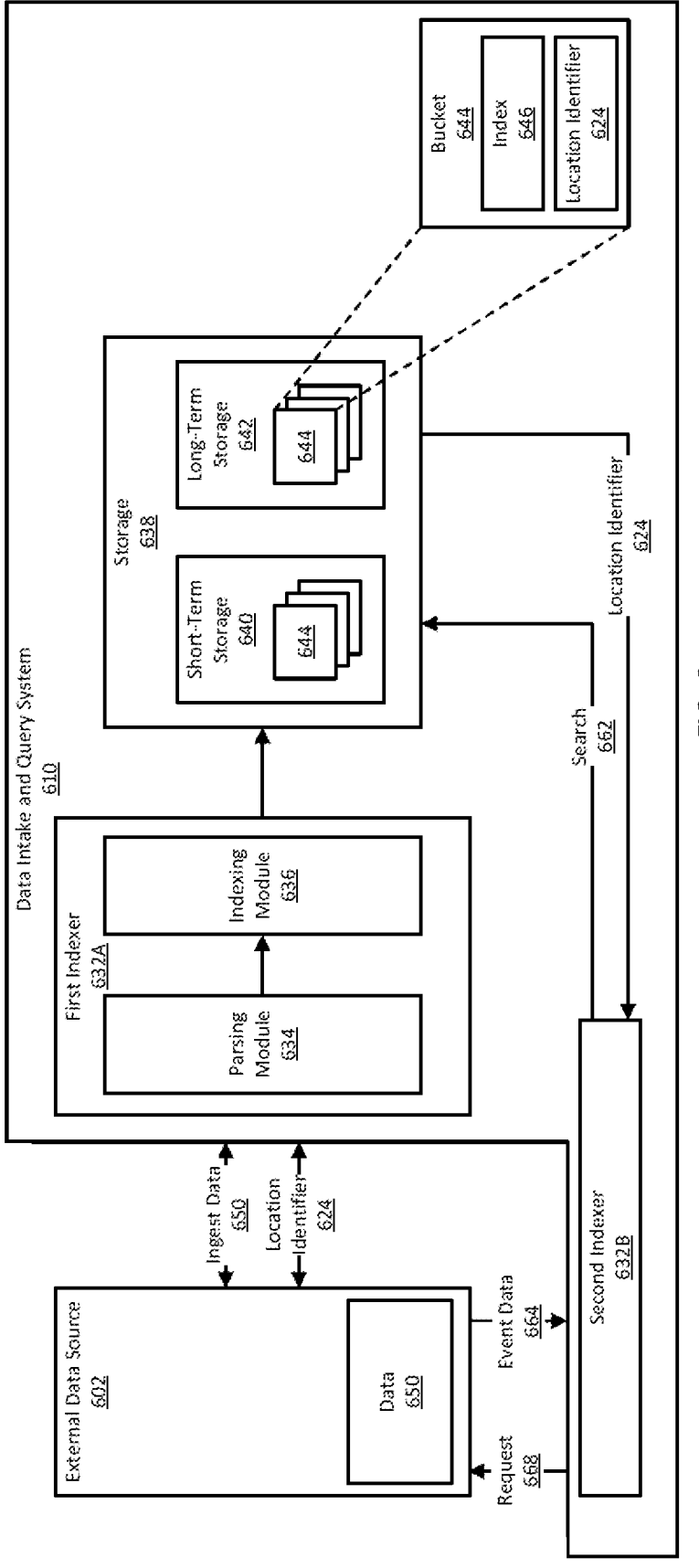
FIG. 6 is a block diagram of an example data intake and query system for generation of indexes and execution of searches on data, in accordance with example embodiments.

FIG. 6 is a block diagram of an example of the data intake and query system, as described above with reference to FIG. 1. Specifically, FIG. 6 illustrates an example computing environment 620 that includes a data intake and query system 610 and an external data source 602. As discussed above, in some cases, the computing environment 620 may include a computing device (e.g., computing device 104 as described above with respect to FIG. 1). The data intake and query system 610 may include a first indexer 632A, a second indexer 632B, and storage 638. As discussed above, in some cases, the data intake and query system 610 may include a user interface system (e.g., user interface system 114 as described above with respect to FIG. 1). In some cases, the data intake and query system 610 can include one or more ingestors, a message bus, one or more forwarders, one or more search heads, a node coordinator, and/or a shared storage system (not shown in FIG. 6). It will be understood that the components illustrated in FIG. 6 are for illustrative purposes only and that the data intake and query system 610 can include fewer or more components.

As discussed above, the data intake and query system 610 can ingest the data 650 (also referred to herein as ingest data 650) from an external data source 602 in the computing environment 600. The ingest data 650 may be data in a particular data format (e.g., the Parquet data format). For example, the ingest data 650 may be structured and/or semi-structured event data in any data format. The data intake and query system 610 may utilize a first indexer 632A to ingest the ingest data 650 from the external data source 602.

The first indexer 632A may use various methods to obtain the ingest data 650 from the external data source 602. For example, as discussed above, the first indexer 632A may obtain the ingest data 650 via an upload, via a monitor of the ingest data 650, via a forwarder, via an event collector, etc.

The data intake and query system 610 may further obtain a location identifier 624 from the external data source 602. In some cases, the data intake and query system 610 may request the location identifier 624 from the external data source 602 and may obtain the location identifier in response to the request. For example, the data intake and query system 610 may ingest the ingest data 650 and, in response to ingesting the ingest data 650 from the external data source 602, may request the location identifier 624. In certain cases, the data intake and query system 610 may determine the location identifier 624 from the ingest data 650.

The location identifier 624 may be indicative of an external location of the external data source 602. In some cases, the location identifier 624 may be or may include a pointer, an address, a link, and/or a reference to the external location of the external data source 602. For example, the location identifier 624 may be a uniform resource locator ("URL"). In some cases, the location identifier 624 may be indicative of a location of the ingest data 650 as stored by (or within) the external data source 602. For example, the location identifier 624 may be indicative of a particular data lake, a particular location within or portion of a particular data lake, etc.

The first indexer 632A may obtain the ingest data 650 from the external data source 602 and process (e.g., transform) the ingest data 650 to generate an index 646. Processing the ingest data 650 may include event generation and event indexing. Event generation may include identifying events within the ingest data 650 and associating all or a portion of the events with a timestamp and possibly other information (which may be referred to herein as metadata). Event indexing may include storing all or a portion of the events in the data structure of an index 646.

As an example, as discussed above, the first indexer 632A can include a parsing module 634 and an indexing module 636 for event generation and event indexing. The parsing module 634 can process the ingest data 650 and output the results of processing the ingest data 650 to the indexing module 636 and the indexing module 636 can generate and store the index 646 based on the ingest data 650.

As discussed above, to generate the index, the first indexer 632A can identify, within the ingest data 650, searchable segments that are parts of fields, searchable segments that are entire fields, or both. The first indexer 632A can organize the searchable segments into a lexicon or dictionary (e.g., via the index 646) for the events, with the lexicon including each searchable segment (e.g., the field "src=10.10.1.1") and a reference to the location (e.g., via the location identifier 624) of each occurrence of the searchable segment within the ingest data 650 (e.g., the location within the ingest data 650 of each occurrence of "src=10.10.1.1"). As discussed further below, the first indexer 632A can store the lexicon in an index 646 (e.g., an index file) to enable indexers to identify at least a portion of the ingest data 650 that matches a search query.

In some cases, an index 646 may correspond to multiple location identifiers. For example, a single index 646 may be based on multiple sets of ingest data obtained from different external locations as identified by multiple location identifiers.

The first indexer 632A can store the index 646 and the location identifier 624 (or multiple location identifiers) within storage 638 (e.g., within buckets 644 of the storage 638). The storage 638 may be a storage data structure on a storage device (e.g., a disk drive or other physical device for storing digital data). While the storage 638 is shown as separate from the first indexer 632A, in some cases, the storage 638 may be local storage. In some cases, the storage 638 may be remote storage.

As discussed above, the first indexer 632A can organize files in the storage 638 in buckets 644. The buckets 644 may be located in long-term storage 642 (e.g., non-volatile data storage) or short-term storage 640 (e.g., volatile data storage) which may correspond to a bucket's status (e.g., as a warm bucket, a cold bucket, a hot bucket, etc.).

The buckets 644 may be referred to as externally distributed buckets in that the buckets 644 may store the index 646 and the location identifier 624 but may not store the ingest data 650 (or a processed version of the ingest data 650). Instead, the ingest data 650 may be located external to the data intake and query system 610 at a location associated with the external data source 602.

In some cases, the first indexer 632A can obtain the ingest data 650 and a separate indexer (e.g., a third indexer) can perform the event generation and/or the event indexing.

The data intake and query system 610 can include a second indexer 632B. In some cases, the first indexer 632A and the second indexer 632B may be part of an indexer cluster. In some cases, the first indexer 632A and the second indexer 632B may be the same indexer or different indexers implemented on the same or different computing devices.

The second indexer 632B may identify a query. For example, the data intake and query system 610 may obtain a query from a user computing device and use a search head (e.g., search head 362 not shown) to process the query. The search head may identify the query as obtained from the user computing device Based on processing the query, the search head may instruct the second indexer 632B to execute a search 662 (corresponding to at least a portion of the query received by the search head) on the storage 638. For example, the second indexer 632B may search the index 646 to identify events responsive to the search. Based on execution of the search, the second indexer 632B may identify the location identifier 624 (or a portion of the location identifier 624) indicative of a location of the events responsive to the search.

The second indexer 632B may utilize the location identifier 624 to identify a location of the events responsive to the search as stored by the external data source 602. The data intake and query system 610 (e.g., via the second indexer 632B) may route a request 668 (the request including the location identifier 624) to the external data source 602 requesting data associated with the location identifier 624. Based on the request, the data intake and query system 610 (e.g., via the second indexer 632B) may obtain the events responsive to the search.

In some cases, the data intake and query system 610 (e.g., via the second indexer 632B) may directly or indirectly search the ingest data 650 as stored by the external data source 602. For example, the second indexer 632B may identify a location of the ingest data 650 using the location identifier 624, download the ingest data 650, and may execute the search on the downloaded ingest data 650 to identify the events responsive to the search. The external data source 602 may provide permissions (e.g., authorizations) to the data intake and query system 610 to obtain the ingest data 650 as stored by the data intake and query system 610. For example, the external data source 602 may provide read only access to the data intake and query system 610.

The data intake and query system 610 may obtain the events responsive to the search as event data 664. As discussed above, based on obtaining the event data 664, the data intake and query system 610 can perform further operations. For example, the data intake and query system 610 can compile search results from multiple indexers (e.g., using a search head). In some cases, the data intake and query system 610 can compile search results based on data stored by the external data source 602 with search results based on data stored by the data intake and query system 610. In another example, the data intake and query system 610 can cause display of at least a portion of the search results (e.g., via a user interface of a user computing device).

2.3. Generation of Indexes and Execution of Searches on Ingest Data Stored at an External Location As discussed above, the data intake and query system can ingest data from an external location and generate an index based on the ingest data. The data intake and query system can execute searches on the data as stored at the external location using the generated index.

The techniques described below can enable a data intake and query system to perform an indexing process to generate an index for a set of data obtained from an external location and discard the set of data (e.g., a local copy of the set of data). The data intake and query system can perform a search process using the generated index and the data as stored at the external location. These techniques solve challenges of existing data intake and query systems in that these systems may enable the searching of data in a format and/or structure as stored and/or generated by the external data source.

While existing systems are able to search different sets of data, such existing systems may be unable to index and search a set of data without processing the set of data and searching the processed set of data based on the index. This can cause issues (e.g., loss of data) and inefficiencies as systems may adjust the set of data and/or remove portions of the set of data or the metadata. As the need to index and search different sets of data increases, it may be important that the system be able to index and search a set of data as generated and/or stored by an external data source.

Figure 7:
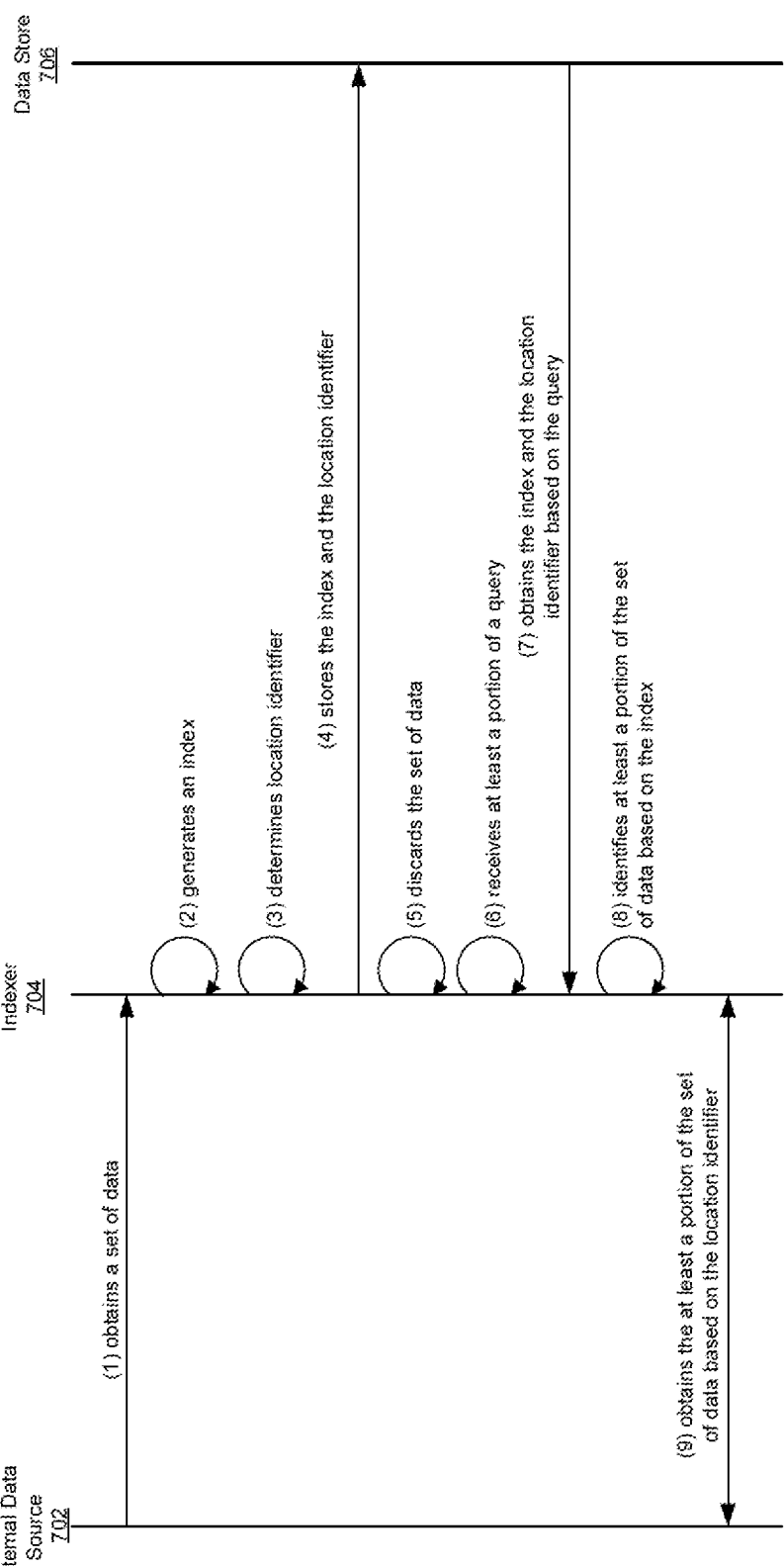
FIG. 7 is a data flow diagram illustrating an example of data flow and communications illustrating an example method for generation of indexes and execution of searches on data.

FIG. 7 is a data flow diagram illustrating an example of data flow and communications between a variety of the components of a distributed data processing system, such as the data intake and query system 110 as described above with respect to FIG. 1, for generation of indexes and execution of queries. The data flow diagram of FIG. 7 illustrates an example of data flow and communications between the external data source 702, an indexer 704, and a data store 706. However, it will be understood that in some cases, one or more of the functions described herein with respect to FIG. 7 can be omitted, performed concurrently or in a different order and/or performed by a different component of the data intake and query system 110. Accordingly, the illustrated example and description should not be construed as limiting. Moreover, although one external data source 702, one indexer 704, and one data store 706 are shown, it will be understood that multiple indexers may interface with the same or different external data sources and/or the same or different data stores. For example, one indexer may interface with multiple data sources 702 and/or multiple data stores 706 or multiple indexers 704 may interface with one or more data sources 702 and/or one or more data stores 706.

At (1), the indexer 704 obtains a set of data from the external data source 702. For example, a first indexer of the one or more indexers can obtain the set of data. The set of data may be in a Parquet data format, an optimized row columnar data or file format, a Lance data format, a Snowflake data format, a MariaDB data format, a Redshift data format, or any other data or file format.

In some cases, the data intake and query system 110 can monitor the external data source 702 to determine when a set of data is uploaded to or removed from a data repository of the external data source and/or a set of data is modified. For example, the data intake and query system 110 may have read only access for the data repository. In some cases, the data intake and query system 110 may receive input from the external data source 702 when a set of data is uploaded to and/or removed from the data repository and/or a set of data is modified. For example, the input may include the set of data.

The set of data may include layout information indicating how to map values in columns of the set of data to metadata, mask columns, rename columns, etc. For example, the set of data may include a json blob with layout information. An example of the layout information is depicted below:

```
1   {
2     "path": "parquet/vpc_data/vpc_c0c309b844f9299182ad13e427dc4523.gz.parquet",
3     "hostColumnName": "cloud.account_vid",
4     "sourceDefault": "ASL_VPC",
5     "sourceTypeColumn": "metadata.product.feature.name",
6     "timestampColumnName": "time",
7     "excludeColumns": [
8         "compliance.requirements.array",
9         "unmapped.map.key",
10        "unmapped.map.value"
11     ]
12   }
13
```

30

For example, hostColumnName, sourceColumnName, source TypeColumnName, and timestampColumnName, may identify columns that are to be mapped to particular fields; hostDefault, sourceDefault, and sourceTypeDefault may indicate default values for particular fields; rawColumnName may indicate values to be treated as raw strings; timestampColumnName may indicate values to populate a time field; timestampUnits may indicate units in a timestamp column; index TimeColumnName may indicate a default for a time field; subsecondsColumnName may indicate if the timestamp column is in seconds and a separate column uses subseconds; includeColumns may indicate columns to be indexed for searching; and excludeColumns may indicate columns to not be indexed for searching.

At (2), the indexer 704 generates an index or index file (one example of which is a tsidx file). In some cases, a second indexer may generate the index. The indexer 704 may generate the index using the obtained set of data. In some cases, the index may be referred to as an external index (file) as the index (and an associated location identifier) may point to data not stored within the data intake and query system 110.

As discussed above, the index may identify portions of the set of data (e.g., keywords). For example, the index may indicate that a particular portion of the set of data is associated with a particular source, a particular host, a particular source type, etc. In some cases, to generate the index, the indexer 704 may treat all or a portion of the columns of the set of data as an indexed field.

At (3), the indexer 704 determines a location identifier. The indexer 704 may determine the location identifier from the set of data obtained from the external data source 702. For example, the set of data may include a URL of an external location where the set of data is stored. The indexer 704 may obtain the location identifier from the external data source 702 or may generate the location identifier based on obtaining the set of data from the external data source.

At (4), the indexer 704 stores the index and the location identifier in the data store 706 (e.g., in a bucket of the data store 706). The data store 706 may be remotely located from the indexer 704. In some cases, the indexer 704 may store additional information with the index and the location identifier. For example, indexer 704 may store one or more column identifiers (e.g., a first column identifier identifying columns of the set of data to treat as events and parse, a second column identifier identifying columns of the set of data to treat as indexed fields and make searchable without parsing, a third column identifier identifiers columns of the set of data that are tracked, etc.) with the index and the location identifier.

At (5), the indexer 704 discards the set of data (e.g., by removing the set of data from local storage or shared storage of the indexer 704). In some cases, the indexer 704 discards the set of data after generation of the index and prior to storing the index and the location identifier in the data store 706. In some cases, the indexer 704 may discard the set of data within a particular time period (e.g., 10 seconds) after generation of the index and/or storing the index and the location identifier in the data store 706. In certain cases, the indexer 704 may discard the set of data in response to an acknowledgement receipt that the set of data has been stored.

At (6), the indexer 704 receives at least a portion of a query. As described above with reference to FIG. 3, a search head of the data intake and query system can receive and process a query and determine that one or more of the indexers 704 are to be used to execute the query.

At (7), the indexer 704 obtains the index and the location identifier from the data store 706 based on the query. For example, the indexer 704 may obtain all or a portion of the indexes associated with (e.g., stored by) the indexer 704. In some cases, the index may include the location identifier and/or may point to the location identifier for a particular portion of the index. For example, the index may indicate that data is stored at a particular location associated with the location identifier.

In some cases, one index may be associated with multiple sets of data and multiple location identifiers. For example, as sets of data are obtained by the indexer 704, the indexer 704 may update an index by appending additional information indicative of the additional sets of data to the index and may store a corresponding location identifier within the data store 706.

At (8), the indexer 704 identifies at least a portion of the set of data based on the index. In some cases, the indexer 704 may identify a particular location identifier associated with the at least a portion of the set of data (e.g., indicative of a location of the at least a portion of the set of data) in response to identifying the at least a portion of the set of data. The indexer 704 may identify that the at least a portion of the set of data is responsive to the query based on the index and may identify a location of the at least a portion of the set of data using the location identifier.

At (9), the indexer 704 obtains the at least a portion of the set of data from the external data source 702 based on the location identifier. For example, the indexer 704 can obtain the at least a portion of the set of data from a location within the external data source 702 as identified by the location identifier. The indexer 704 may process the at least a portion of the set of data retrieved from the external data source 702 in accordance with the received at least a portion of the query to generate partial results. The indexer may communicate the partial results to a search head, which my further process the results along with other partial results received from other indexers and communicate the results to a user.

Although only one indexer 704 is shown in FIG. 7, it will be understood that the data flow and processes described herein may be implemented using multiple indexers 704 sharing different responsibilities (e.g., one indexer may receive the set of data, another indexer may generate an index based on the set of data and/or another indexer may use the generated indexer to execute at least a portion of a query) and/or may be implemented by multiple indexers performing similar processes and functions concurrently or in parallel. For example, multiple indexers 704 may concurrently (at the same time or at overlapping times) (1) receive respective sets of data from the same or respective external data sources 702, (2) generate respective indexes, (3) determine respective location identifiers, (4) store the index and the location identifiers in respective buckets in the same or respective data stores, and/or (5) discard the respective sets of data. Similarly, multiple indexers may concurrently (6) receive at least a portion of the same or respective queries, (7) obtain respective indexes and the location identifiers based on the portion of the query, (8) identify portions of the set of data based on the respective indexes, (9) obtain the portions of the set of data from the same or respective external data sources 702, further process the retrieved portions of the set of data based on the same or respective queries, and/or provide the partial results to the same or respective search heads.

Figure 8:
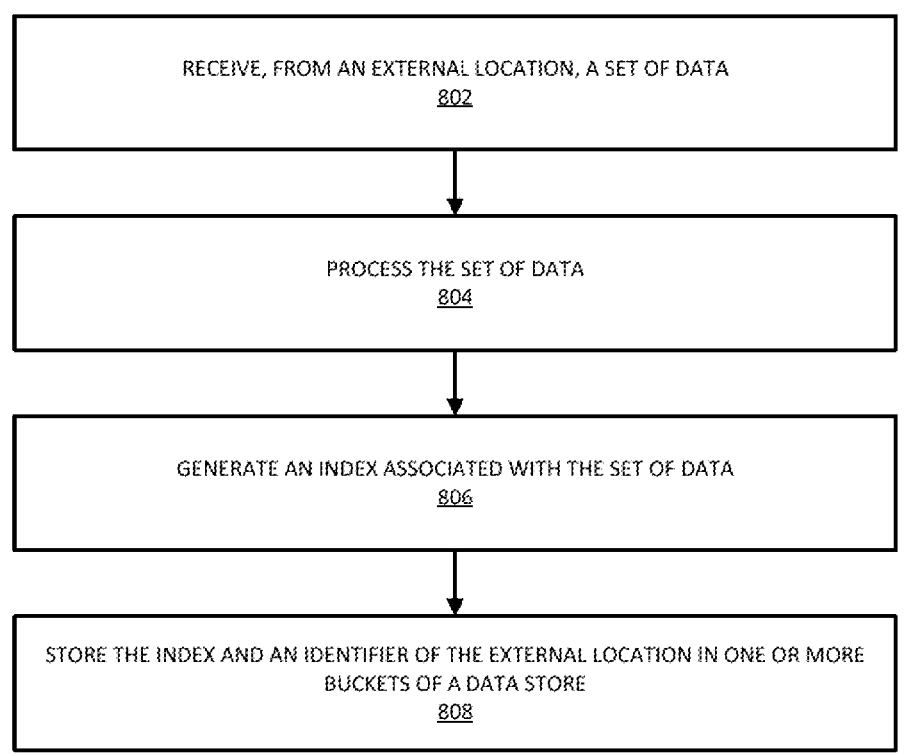
FIG. 8 is a flow diagram illustrative of an example of a routine, implemented by a computing device of a data intake and query system, for generation of indexes and execution of searches on data stored at an external location.

Turning to FIG. 8, an illustrative algorithm or routine 800 will be described for an indexing process. The routine 800 may be implemented, for example, by the data intake and query system 110 described above with reference to FIG. 1. The routine begins at block 802, where the data intake and query system 110 receives, from an external location (e.g., a first external location), a set of data. For example, the data intake and query system 110 may receive the set of data from an external location associated with a first computing system (e.g., a remote computing system, an external data source, etc.). For example, the first computing system may be distinct and separate from the data intake and query system 110. The data intake and query system 110 may receive the set of data at a first indexer of the data intake and query system 110.

In some cases, the external location may be a data lake. The external location may be external to and/or remote from the data intake and query system 110.

In some cases, the set of data may include structured and/or semi-structured machine data in a particular format or structure (e.g., structured data having particular columns, metadata, metrics, data enrichments, etc.). For example, the set of data may be a Parquet file. The first computing system may generate and/or store the set of data in the particular format. In some cases, the first computing system may obtain the set of data in the particular format and/or process the set of data such that the set of data has the particular format.

In some cases, the data intake and query system 110 may identify that the set of data is stored at the external location. For example, the data intake and query system 110 may receive a notification from the first computing system indicating that the set of data is uploaded to the external location. The data intake and query system 110 may receive the set of data in response to identifying that the set of data is stored at the external location.

At block 804, the data intake and query system 110 processes the set of data. The data intake and query system 110 may process the set of data using the first indexer. For example, the data intake and query system 110 may process the set of data to identify one or more fields based on one or more columns within the set of data (e.g., the set of data may be formatted according to a Parquet data format and may have one or more columns).

At block 806, the data intake and query system 110 generates an index associated with the set of data. The data intake and query system 110 may generate the index based on processing the set of data. The data intake and query system 110 may generate the index using the first indexer.

In some cases, the index may be or may include an inverted index as discussed above. The inverted index may include information regarding a partition associated with events and/or an origin of the events. All or a portion of the events may include a portion of the set of data associated with a time stamp. The inverted index may include a plurality of entries and all or a portion of the plurality of entries may include a token or a field-value pair and/or one or more event references. The one or more event references may be indicative of an event that includes the token or field-value corresponding to the field-value pair.

At block 808, the data intake and query system 110 stores the index and an identifier (e.g., a location identifier) of the external location in one or more data stores (e.g., one or more buckets of one or more data stores). For example, the data intake and query system 110 may store the index and the identifier in a first bucket of a first data store. The data intake and query system 110 may store the index and the identifier of the external location using the first indexer. The data intake and query system 110 may store the index and the identifier of the external location at a second location that is separate and distinct from a first location corresponding to the external location. In some cases, the data intake and query system 110 may store the index and the identifier of the external location with additional information associated with the set of data (e.g., metadata).

In some cases, the data intake and query system 110 may update (e.g., adjust) the index. For example, the data intake and query system 110 may update the index based on a second set of data received by the data intake and query system 110 from the first external location. In another example, the data intake and query system 110 may update the index based on a second set of data received by the data intake and query system 110 from a second external location (e.g., associated with a second computing system). To update the index, the data intake and query system 110 may append additional information to the index.

In some cases, the data intake and query system 110 may store a second index and an identifier (e.g., a second location identifier) of a second external location associated with a second computing system in the one or more data stores (e.g., a second bucket of the first data store, a second bucket of a second data store, etc.). The data intake and query system 110 may generate the second index based on a second set of data received from the second external location.

The data intake and query system 110 may generate the identifier of the external location based on obtaining the set of data from the external location. For example, the identifier of the external location may be indicative of the external location (e.g., where the set of data is stored) and/or the remote computing system. The identifier of the external location may be a link, a pointer, a reference, and/or an address.

Based on processing the set of data, generating the index, and/or storing the index and the identifier of the external location, the data intake and query system 110 may discard the set of data. For example, the data intake and query system 110 may remove the set of data from local storage and/or shared storage of the data intake and query system. In another example, the data intake and query system 110 may remove the set of data from a local data store of or associated with the first indexer.

The data intake and query system 110 may execute at least a portion of a query based on the index and the identifier of the external location. For example, the data intake and query system 110 may obtain a query (e.g., from a user computing device) and the data intake and query system 110 may assign a second indexer of the data intake and query system 110 to perform one or more searches corresponding to at least a portion of the query. To perform the one or more searches, the second indexer may identify at least a portion of the set of data responsive to the at least a portion of the query using the index. The second indexer may download the at least a portion of the set of data from the external location using the index and the identifier of the external location and the second indexer may perform the one or more searches on the at least a portion of the set of data. In some cases, the second indexer may use additional information associated with the set of data (e.g., the metadata stored with the index and the identifier of the external location) to perform the one or more searches. Based on performing the one or more searches on the at least a portion of the set of data, the second indexer may identify at least partial query results. Further, the second indexer may route the at least partial query results to a search head, to a computing device for display, etc.

The example process 800 can be implemented, for example, by a computing device that includes a processor and a non-transitory computer-readable medium. The non-transitory computer readable medium can be storing computer-executable instructions that, when executed by the processor, can cause the processor to perform the operations of the illustrated process 800. Alternatively or additionally, the process 800 can be implemented using a non-transitory computer-readable medium storing computer-executable instructions that, when executed by one or more processors, case the one or more processors to perform the operations of the process 800 of FIG. 8.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A method, comprising:

receiving, at a first indexer, from a first external location in a first computing system, a first set of data;

processing, by the first indexer, the first set of data;

generating, by the first indexer, a first index using the first set of data from the first external location based at least in part on processing the first set of data;

storing, by the first indexer, the first index and a location identifier generated to identify the first external location from which the first set of data is obtained, in one or more buckets of a data store; and executing a search query, wherein executing the search query comprises:

identifying, using the first index generated using the first set of data from the first external location, that at least a first portion of the first set of data from the first external location is responsive to the search query based at least in part on processing the search query;

based on identifying the at least the first portion of the first set of data being responsive to the search query, obtaining, using the location identifier stored by the first indexer and identifying the first external location from which the first set of data is obtained from the first external location, the at least the first portion of the first set of data based at least in part on the search query; and processing the at least the first portion of the first set of data obtained from the first external location in accordance with the search query to generate one or more results.

2. The method of claim 1, wherein the location identifier comprises at least one of a link, a pointer, a reference, or an address.

3. The method of claim 1, wherein the first external location comprises a data lake.

4. The method of claim 1, further comprising:

discarding the first set of data.

5. The method of claim 1, further comprising:

discarding the first set of data from the data store based at least in part on processing the first set of data.

6. The method of claim 1, wherein storing the first index and the location identifier in the one or more buckets comprises storing the first index and the location identifier in a first bucket of the one or more buckets, the method further comprising:

storing, in a second bucket of the one or more buckets, a second index and a second location identifier of a second external location in a second computing system, wherein the second index is based at least in part on a second set of data received from the second external location.

7. The method of claim 1, wherein storing the first index and the location identifier in the one or more buckets comprises storing the first index and the location identifier in a particular bucket of the one or more buckets, the method further comprising:

receiving, from a second external location in a second computing system, a second set of data; and adjusting the first index based at least in part on the second set of data such that the first index is associated with the first set of data and the second set of data.

8. The method of claim 1, wherein the first set of data is stored at a first location, wherein the first index is stored at a second location, and wherein the first location and the second location are separate, distinct locations.

9. The method of claim 1, wherein the first set of data comprises a Parquet file.

10. The method of claim 1, wherein, based at least in part on the first index, a second indexer downloads at least a second portion of the first set of data from the first external location and executes one or more searches on the downloaded at least the second portion of the first set of data.

11. The method of claim 1, wherein the first index comprises an inverted index, and wherein the inverted index has information regarding at least one of a partition associated with events or an origin of the events, each event of the events comprising a respective portion of the first set of data associated with a respective time stamp, the inverted index comprising a plurality of entries, each entry of the plurality of entries comprising:

a respective token or a respective field-value pair, and one or more respective event references, each event reference of the one or more respective event references indicative of a respective event that includes the respective token or a field-value corresponding to the respective field-value pair.

12. The method of claim 1, wherein the first set of data comprises raw machine data.

13. The method of claim 1, wherein the first indexer is an indexer of a data intake and query system, wherein the data intake and query system is distinct and separate from the first computing system.

14. The method of claim 1, further comprising:

identifying that the first set of data is stored at the first external location, wherein receiving the first set of data comprises receiving the first set of data in response to identifying that the first set of data is stored at the first external location.

15. The method of claim 1, wherein metadata associated with the first set of data is stored at the first external location, and wherein a second indexer utilizes the metadata to execute one or more searches.

16. The method of claim 1, wherein the location identifier is generated based on one or more communications from an external data source at the first external location.

17. A system comprising:

a data store; and one or more processors configured to:

receive, at a first indexer, from a first external location in a first computing system, a first set of data;

process, by the first indexer, the first set of data;

generate, by the first indexer, a first index using the first set of data from the first external location based at least in part on processing the first set of data;

store, by the first indexer, the first index and a location identifier generated to identify the first external location from which the first set of data is obtained, in one or more buckets of the data store; and execute a search query, wherein executing the search query comprises:

identifying, using the first index generated using the first set of data from the first external location, that at least a first portion of the first set of data from the first external location is responsive to the search query based at least in part on processing the search query;

based on identifying the at least the first portion of the first set of data being responsive to the search query, obtaining, using the location identifier stored by the first indexer and identifying the first external location from which the first set of data is obtained from the first external location, the at least the first portion of the first set of data based at least in part on the search query; and process the at least the first portion of the first set of data obtained from the first external location in accordance with the search query to generate one or more results.

18. The system of claim 17, wherein the one or more processors are further configured to:

discard the first set of data from the data store based at least in part on processing the first set of data.

19. The system of claim 17, wherein to store the first index and the location identifier in the one or more buckets, the one or more processors are further configured to store the first index and the location identifier in a particular bucket of the one or more buckets, wherein the one or more processors are further configured to:

receive, from a second external location in a second computing system, a second set of data; and adjust the first index based at least in part on the second set of data such that the first index is associated with the first set of data and the second set of data.

20. Non-transitory computer-readable media including computer-executable instructions that, when executed by a particular computing system, cause the particular computing system to:

receive, at a first indexer, from a first external location in a first computing system, a first set of data;

process, by the first indexer, the first set of data;

generate, by the first indexer, a first index using the first set of data from the first external location based at least in part on processing the first set of data;

store, by the first indexer, the first index and a location identifier generated to identify the first external location from which the first set of data is obtained, in one or more buckets of a data store; and execute a search query, wherein executing the search query comprises:

identifying, using the first index generated using the first set of data from the first external location, that at least a first portion of the first set of data from the first external location is responsive to the search query based at least in part on processing the search query;

based on identifying the at least the first portion of the first set of data being responsive to the search query, obtaining, using the location identifier stored by the first indexer and identifying the first external location from which the first set of data is obtained from the first external location, the at least the first portion of the first set of data based at least in part on the search query; and processing the at least the first portion of the first set of data obtained from the first external location in accordance with the search query to generate one or more results.

* * * * *